US006850576B2

(12) United States Patent
Fujimura et al.

(10) Patent No.: US 6,850,576 B2
(45) Date of Patent: Feb. 1, 2005

(54) METHOD AND APPARATUS FOR REPRODUCING TIMING, AND A DEMODULATING APPARATUS THAT USES THE METHOD AND APPARATUS FOR REPRODUCING TIMING

(75) Inventors: Akinori Fujimura, Tokyo (JP); Seiji Okubo, Tokyo (JP); Toshiharu Kojima, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 657 days.

(21) Appl. No.: 09/775,595

(22) Filed: Feb. 5, 2001

(65) Prior Publication Data

US 2001/0031021 A1 Oct. 18, 2001

(30) Foreign Application Priority Data

Mar. 17, 2000 (JP) ..................................... 2000-076899

(51) Int. Cl.[7] .............................................. H04L 27/14
(52) U.S. Cl. ...................... 375/324; 375/149; 375/355; 375/326; 375/240.01; 600/453
(58) Field of Search ................................ 375/324, 149, 375/326, 355, 240.01

(56) References Cited

U.S. PATENT DOCUMENTS

| | | | | |
|---|---|---|---|---|
| 4,518,994 A | * | 5/1985 | Schnitzler | ............... 375/240.01 |
| 5,170,415 A | * | 12/1992 | Yoshida et al. | ............. 375/326 |
| 5,235,622 A | * | 8/1993 | Yoshida | ....................... 375/355 |
| 5,671,257 A | * | 9/1997 | Cochran et al. | ............ 375/355 |
| 6,097,766 A | * | 8/2000 | Okubo et al. | ................ 375/324 |
| 6,212,222 B1 | * | 4/2001 | Okubo et al. | ................ 375/149 |
| 6,415,004 B1 | * | 7/2002 | Fujimura et al. | ........... 375/324 |
| 6,520,915 B1 | * | 2/2003 | Lin et al. | ..................... 600/453 |

FOREIGN PATENT DOCUMENTS

JP  6-141048  5/1994

JP  06141048  * 5/1994  ........... H04L/27/22

OTHER PUBLICATIONS

F. Patenaude, et al., Proceedings of the International Conference on Communications, vol. 14, pp. 1588–1592, "A New Symbol Timing Tracking Algorithm for $\pi/2$–BPSK and $\pi/4$–QPSK Modulations", Jun. 14, 1992.

F. M. Gardner, IEEE Transactions on Communications, vol. 41, No. 3, pp. 501–507, "Interpolation in Digital Modems—Part I: Fundamentals", Mar. 1, 1993.

Akinori Fujimura, et al. "Timing Recovery Scheme Using Received Signal Phase for $\pi/4$ Shifted QPSK Modulation" Japanese Electronics Information and Communication Institute Convention 1996 p. 450 with Partial Translation.

Akinori Fujimura, et al. "Timing Recovery Scheme Using Received Signal Phase Information for QPSK Modulation" Journal of Japanese Electronics Information and Communication Institute, Jun. 1, 1998, pp. 665–668 with Partial Translation.

* cited by examiner

*Primary Examiner*—Stephen Chin
*Assistant Examiner*—Sudhanshu C. Pathak
(74) *Attorney, Agent, or Firm*—Oblon, Spivak, McClelland, Maier & Neustadt, P.C.

(57) ABSTRACT

A base band signal is sampled, based on an asynchronous sampling clocking, to output two sampled data series. A transmission side complex symbol frequency generator generates a complex transmission symbol frequency component combining an envelope value and an amplitude change amount value, which are each calculated from the two sampled data series. The transmission side complex symbol frequency component is provided to a correlation value calculator that outputs a correlation data series correlated to the complex symbol frequency and the symbol frequency generated by a cosine wave generator. The correlation data series is converted a timing error by an inverse tangent calculator. By the above configuration, a timing reproducing unit, which includes the above components, determines the timing error at a sampling speed of twice the symbol rate.

30 Claims, 10 Drawing Sheets

METHOD AND APPARATUS FOR REPRODUCING TIMING, AND A DEMODULATING APPARATUS THAT USES THE METHOD AND APPARATUS FOR REPRODUCING TIMING

FIELD OF THE INVENTION

The present invention in general relates to a method and apparatus capable of detecting a phase timing error in a received base band signal, and a demodulating apparatus that uses the method and apparatus for reproducing timing. More particularly, this invention relates to a method and apparatus used in wide-band digital radio communication system.

BACKGROUND OF THE INVENTION

Recently a drastic progress is made in the field of the digital radio communication system. In the digital radio communication system, it is necessary that the timing phase be estimated at high speed and high precision at the reception side. Such timing phase estimation is disclosed, for example, in Japanese Laid-open Patent No. 6-141048. This reference discloses a signal detecting system and a burst demodulating apparatus. A correlation between a signal obtained by nonlinear processing, such as enveloping determined from the received base band signal, and a symbol frequency component generated from an asynchronous sample clock is obtained, and timing phase of the asynchronous sample clock and received base band signal are estimated.

The block diagram in FIG. 10 shows a part of a conventional digital radio communication system. This conventional digital radio communication system has a conventional demodulator that in turn has a conventional timing reproducing unit. An antenna 101 receives a burst signal in a PSK modulated RF (radio frequency) band. A frequency converter 102 converts the received RF band signal into a base band signal (received base band signal Sb).

An A/D converter 103$a$, using an asynchronous sampling clock CK having a frequency of n (n=2) times of symbol rate issued from an oscillator 106, samples the received base band signal Sb at time t (=τ+iT/2). The A/D converter 103$a$ outputs an in-phase component of the sampled received base band signal Sb as in-phase data series $I_i$. Here, "i" is a natural number, "T" is a symbol period, and "τ" is a timing error (−T/2≦τ<T/2). Similarly, an A/D converter 103$b$, using an asynchronous sampling clock CK having a frequency of two times of symbol rate issued from the oscillator 106, samples the received base band signal Sb at time t (=τ+iT/2). The A/D converter 103$b$ outputs an orthogonal component of the sampled received base band signal Sb as orthogonal data series $Q_i$.

A timing reproducing unit 104 calculates a timing error τ from the in-phase data series $I_i$ and orthogonal data series $Q_i$. On the other hand, a data interpolating unit 112 is used when the sampling speed is low, and the reception data composed of in-phase data series $I_i$ and orthogonal data series $Q_i$ sampled by the asynchronous sampling clock CK with time resolution of n [sample/symbol] is issued by interpolating with the reception data having a time resolution n' (n'>n) [sample/symbol] each. The data interpolating unit 112 does not interpolate when the sampling speed is high.

A data judging unit 113 extracts the Nyquist point of the reception data interpolated by the data interpolating unit 112 by using the timing error X entered from the timing reproducing unit 104, and outputs the judged value of the reception data at this extracted Nyquist point as demodulated data D1.

On the other hand, an envelope detector 105 of the timing reproducing unit 104 outputs an envelope data $E_i$ showing an envelope of the received base band signal Sb, from the in-phase data series $I_i$ and orthogonal data series $Q_i$, according to equation (1).

$$Ei=((Ii)^2+(Qi)^2)^{1/2} \quad (1)$$

The oscillator 106 outputs an asynchronous sampling clock CK having a frequency of n (n=2) times of symbol rate. A complex sine wave generator 107 operates an m-bit counter by using the asynchronous sampling clock CK, and outputs cosine signal data $C_i$ of symbol frequency fs (=1/T) and sine signal data $S_i$ of symbol frequency fs, according to the m-bit counter value $Y_i$ ranging from 0 to 2π. Herein, the relation between n and m is n=$2^m$, and $Y_i \ldots Y_i \in \{0, 1, 2, 3, \ldots, 2^{m-1}\}$. That is, the complex sine generator 107 generates symbol frequency component exp [j2π·fst] of symbol frequency fs, and sine signal data $S_i$ and cosine signal data $C_i$ are respectively issued as equation (2) and equation (3).

$$C_i=\cos(Y_i/2m-1)\pi \quad (2)$$

$$S_i=\sin(Y_i/2m-1)\pi \quad (3)$$

The cosine signal data $C_i$ n-times over-sampled data series of cosine component cos (2π·fst) of symbol frequency fs, and the sine signal data $S_i$ is n-times over-sampled data series of sine component sin (2π·fst) of symbol frequency fs.

A correlation value calculator 108 multiplies the envelope data $E_i$ issued from the envelope detector 105, and cosine signal data $C_i$ and sine signal data $S_i$ issued from the complex sine wave generator 107 according to equation (4) and equation (5), and determines multiplication results $MC_i$, $MS_i$.

$$MC_i=E_i \times C_i \quad (4)$$

$$MS_i=E_i \times S_i \quad (5)$$

Further, the correlation value calculator 108 averages the multiplication results $MC_i$, $MS_i$ individually by L symbol time, and outputs correlation signals $CI_i$, $SI_i$ according to equation (6) and equation (7).

$$CI_i=(MC_i+MC_{i-1}+\ldots+MC_{i-nL+1})/L \quad (6)$$

$$SI_i=(MS_i+MS_{i-1}+\ldots+MS_{i-nL+1})/L \quad (7)$$

An inverse tangent calculator 109 determines the timing phase difference Δθ of the correlation signals $CI_i$, $SI_i$, according to equation (8).

$$\Delta\theta 32 \tan^{-1}(SI_i/CI_i) \quad (8)$$

The inverse tangent calculator 109 outputs the timing error τ based on this timing phase error Δθ.

The timing reproducing unit 104 process as explained above when the reception timing of burst signal is known, but when the reception timing of burst signal is unknown and it is required to establish the burst timing synchronism of the burst signal, the burst signal is detected, and the burst timing can be established based on the detected information. In this case, a vector length calculator 110 in the timing reproducing unit 104 determines and outputs the vector length $V_i$ indicated by the correlation signals $CI_i$, $SI_i$ issued by the correlation value calculator 108, according to equation (9).

$$V_i=(CI_i^2+SI_i^2)^{1/2} \qquad (9)$$

A comparator 111 compares the vector length $V_i$ and threshold $\epsilon$, and when the vector length $V_i$ is larger than the threshold $\epsilon$, it is judged that the burst signal has been received, and signal detection information D2 of logic "1" is issued, and when the vector length $V_i$ is smaller than the threshold $\epsilon$, it is judged that no signal has been received, and signal detection information D2 of logic "0" is issued.

Thus, the timing reproducing unit 104 samples asynchronously at speed of n times of the symbol rate, and calculates the correlation by the symbol frequency component by using the sampled information, so that the timing phase can be estimated at high precision and high speed.

As mentioned above, the asynchronous sampling speed is n times of the symbol rate, but since the lower limit value of n is 4 in order to realize the correlation calculation by the correlation value calculator 108 according to equations (4) to (7), the timing phase difference $\Delta\theta$ cannot be calculated by using a smaller value for n.

For example, at n =4, the cosine signal Data $C_i$ to be used is {1, 0, -1, 0, . . . }, and the sine signal data $S_i$ is {0, -1, 0, -1, . . . }, and thus the multiplication operation is easy at n=4, but at n=1, the cosine signal data $C_i$ is {1, -1, 1, -1, . . . } and the sine signal data $S_i$ {0, 0, 0, 0, . . . }, and although the correlation signal $CI_i$ at the in-phase component side is determined, but the correlation signal $SI_i$ at the orthogonal component side is always 0, not expressing the true value, and there are two values for the timing phase difference $\Delta\theta$, that is, {0, $\pi$}. In this case, the timing error of maximum ±T/2 occurs regardless of the state of C/N (ratio of carrier signal to noise signal).

Recently, on the other hand, a keen attention is given toward sa wide-band radio communication system which realizes transmission of moving images or transmission of huge amount of data transmission by means of radio circuit. In this wide-band radio communication system, the data transmission speed must be increased from the conventional speed range of tens to hundreds of kbps mainly used for audio communication, to a speed range of tens to hundreds of Mbps.

However, depending on the devices using CMOS gate array or the like, the maximum operating speed of the demodulating apparatus is tens to hundreds of Mbps, and therefore when the data sampling speed (speed of n times of symbol rate) becomes higher, the sampling speed may exceed the maximum operating speed of the demodulating apparatus, and the demodulating apparatus for performing such timing reproduction operation cannot be applied in the wide-band radio communication system.

For example, in the case of QPSK modulation system with data transmission speed of 100 Mbps, that is, the symbol rate of 50M bands, when the demodulating apparatus composed of digital circuits is realized by using the device with the maximum operating speed of 150 MHz, since n≧4, the lower limit value of the sampling speed is 50×4=200 MHz, and this sampling speed exceeds the maximum operating speed of the device of 150 MHz, and the demodulating apparatus performing such timing reproduction operation cannot be applied in the wide-band radio communication system.

SUMMARY OF THE INVENTION

It is an object of the present invention to provide method and apparatus capable of estimating the timing phase at the same high precision and high speed as in the prior art even if the lower limit of the sampling speed is lowered, and thereby capable of raising the maximum operating speed of the demodulating apparatus relatively. It is also an object of the present invention to provide a demodulating apparatus that uses the method and apparatus for reproducing timing.

In the timing reproducing apparatus according to one aspect of the present invention, a complex symbol frequency component generating unit generates a transmission side complex symbol frequency component from a received base band signal and outputs the generated component as a transmission complex symbol frequency component signal, a correlation value calculating unit determines the correlation value between a cosine wave signal of a free-running symbol frequency generated at the reception side and the transmission complex symbol frequency component signal and outputs the determined value as a correlation signal, and an inverse tangent unit calculates a vector angle indicated by the correlation signal and determines a phase timing error between the received base band signal and free-running symbol frequency based on this vector angle. Accordingly, the demodulation timing at the Nyquist point can be obtained based on the phase timing error.

In the timing reproducing apparatus according to another aspect of the present invention, a complex symbol frequency component generating unit generates a transmission side complex symbol frequency component from a received base band signal and outputs the generated component as a transmission complex symbol frequency component signal, a correlation value calculating unit determines the correlation value between a cosine wave signal of a free-running symbol frequency generated at the reception side and the transmission complex symbol frequency component signal and outputs the determined value as a correlation signal, an inverse tangent unit calculates a vector angle indicated by the correlation signal and determines a phase timing error between the received base band signal and free-running symbol frequency based on this vector angle, a vector length calculating unit calculates the vector length indicated by the correlation signal, and a comparing unit compares the vector length with a predetermined threshold and outputs burst detection information that indicates detection of a burst signal when the vector length is longer than the predetermined threshold. Accordingly, the period of the burst timing can be established based on the burst detection information.

In the demodulating apparatus according to still another aspect of the present invention, a frequency converting unit converts the radio reception signal received by an antenna into a received base band signal, an A/D converting unit samples the received base band signal at a double speed of symbol rate, and converts and outputs as a reception digital base band signal, a timing reproducing unit determines the amplitude change amount between the envelope value of the reception digital base band signal and ½ symbol, further determines the correlation value between the complex symbol frequency component combining the envelope value and the amplitude change amount, and the cosine wave component of the free-running symbol frequency signal generated at the reception side, and calculates the vector angle indicated by the correlation value, thereby determining the phase timing error between the reception digital base band signal and the free-running symbol frequency signal, a data interpolating unit interpolates the reception digital base band signal, and outputs the interpolated data as interpolated base band, and a data judging unit extracted the Nyquist point of the interpolated base band signal based on the phase timing error determined by the timing reproducing unit, and outputs the data at the extracted Nyquist point as demodulated data.

In the demodulating apparatus according to still another aspect of the present invention, a limiter constantly envelopes the radio reception signal received by the antenna, and outputs this constantly enveloped signal, a frequency converting unit converts the constantly enveloped signal into a received base band signal, an A/D converting unit samples the received base band signal at a double speed of symbol rate, and converts and outputs as a reception digital base band signal, a timing reproducing unit multiplies the reception digital base band signal by a predetermined number, determines the amplitude change amount between the variance value of one symbol before and after the multiplied reception digital base band signal and ½ symbol of the reception digital base band signal, further determines the correlation value between the complex symbol frequency component combining the variance value and the amplitude change amount, and the cosine wave component of the free-running symbol frequency signal generated at the reception side, and calculates the vector angle indicated by the correlation value, thereby determining the phase timing error between the reception digital base band signal and the free-running symbol frequency signal, a data interpolating unit interpolates the reception digital base band signal, and outputs the interpolated data as interpolated base band, and a data judging unit extracts the Nyquist point of the interpolated base band signal based on the phase timing error determined by the timing reproducing unit, and issued the data at the extracted Nyquist point as demodulated data.

In the timing reproducing method according to still another aspect of the present invention, the complex symbol frequency component generating step generates a transmission side complex symbol frequency component from a received base band signal, and outputs as a transmission complex symbol frequency component signal, the correlation value calculating step determines the correlation value between a cosine wave signal of a free-running symbol frequency generated at the reception side and the transmission complex symbol frequency component signal, and outputs this correlation value as a correlation signal, and the inverse tangent step calculates a vector angle indicated by the correlation signal, and determines a phase timing error between the received base band signal and free-running symbol frequency based on the vector angle.

In the timing reproducing method according to still another aspect of the present invention, the complex symbol frequency component generating step generates a transmission side complex symbol frequency component from a received base band signal, and outputs as a transmission complex symbol frequency component signal, the correlation value calculating step determines the correlation value between a cosine wave signal of a free-running symbol frequency generated at the reception side and the transmission complex symbol frequency component signal, and outputs this correlation value as a correlation signal, the inverse tangent step calculates a vector angle indicated by the correlation signal, and determines a phase timing error between the received base band signal and free-running symbol frequency based on the vector angle, the vector length calculating step calculates the vector length indicated by the correlation signal, and the comparing step compares the vector length with a predetermined threshold, and outputs burst detection information showing detection of a burst signal when the vector length is longer than the predetermined threshold.

Other objects and features of this invention will become apparent from the following description with reference to the accompanying drawings.

DESCRIPTION OF THE PREFERRED EMBODIMENTS

Preferred embodiments of the method and apparatus for reproducing timing and the demodulating apparatus according to the present invention will be explained below with reference to the attached drawings.

Figure 1:
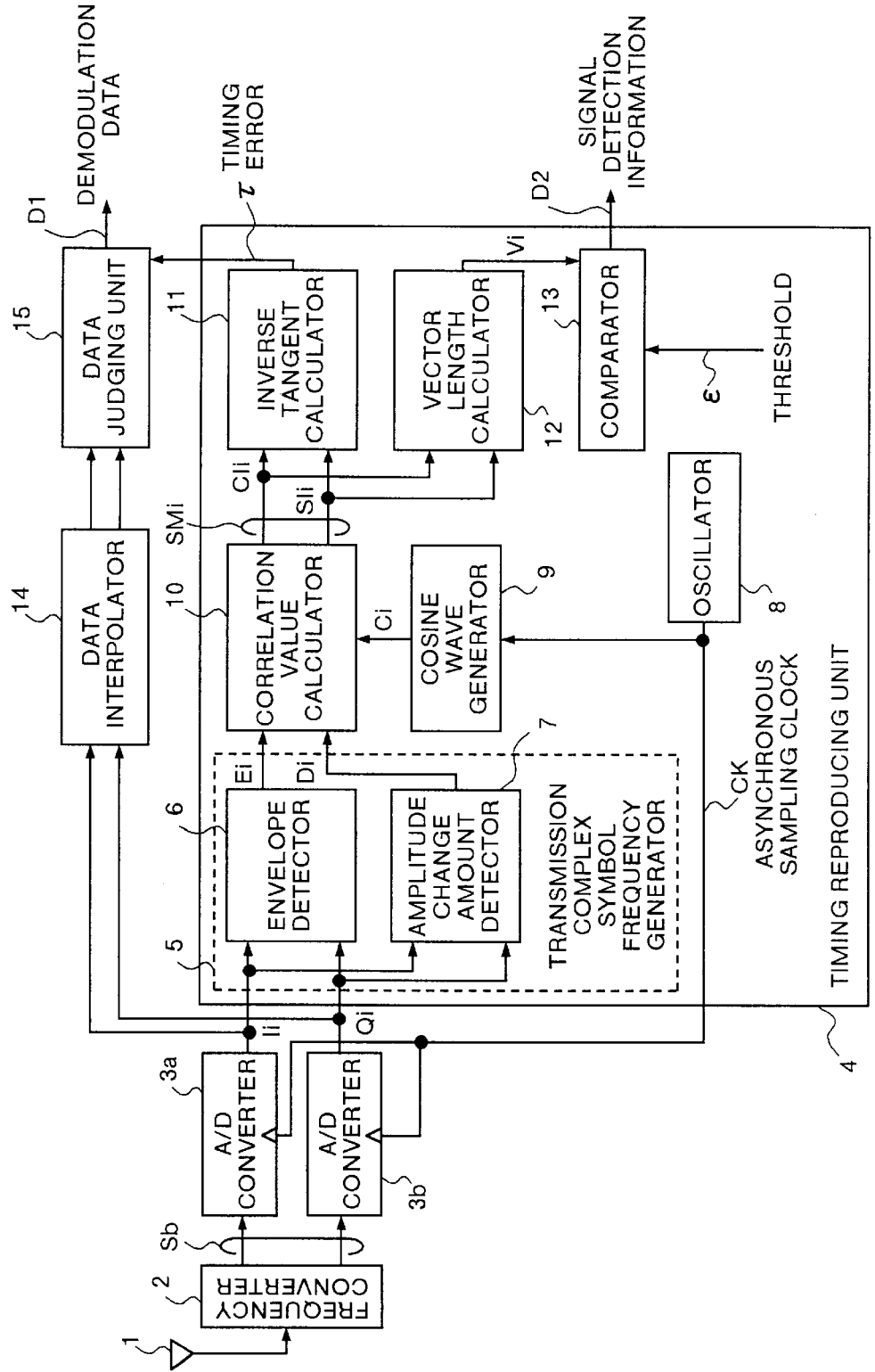
FIG. 1 is a block diagram showing a part of configuration of a timing reproducing apparatus according to a first embodiment of the invention, and a receiver of digital radio communication system comprising a demodulating apparatus using the same.

FIG. 1 is a block diagram showing a part of configuration of timing reproducing apparatus according to a first embodiment of the invention. FIG. 1 also shows a receiver of a digital radio communication system that includes a modulating apparatus that uses the timing reproducing apparatus of the invention. An antenna 1 receives a burst signal in a PSK modulated RF (radio frequency) band. A frequency converter 2 converts the RF band reception signal entered from the antenna 1 into a base band signal (received base band signal Sb).

An A/D converter 3a, using an asynchronous sampling clock CK having a frequency of two (n=2) times of symbol rate issued from an oscillator 8, samples the received base band signal Sb at time t ($=\tau+iT/2$), and outputs the in-phase component of the sampled received base band signal Sb as in-phase data series $I_i$. Here, "i" is a natural number, "T" is a symbol period, and "τ" is a timing error ($-T/2 \leq \tau < T/2$). Similarly, an A/D converter 3b, using an asynchronous sampling clock CK having a frequency of two times of symbol rate issued from the oscillator 8, samples the received base band signal Sb at time t ($=\tau+iT/2$), and outputs the orthogonal component of the sampled received base band signal Sb as orthogonal data series $Q_i$.

A timing reproducing unit 4 calculates a timing error τ from the in-phase data series $I_i$ and orthogonal data series $Q_i$. On the other hand, a data interpolating unit 14 is used when the sampling speed is low, and the reception data composed of in-phase data series $I_i$ and orthogonal data series $Q_i$ sampled by the asynchronous sampling clock CK with time resolution of 2 [sample/symbol] is issued by interpolating with the reception data having a time resolution n' (n'>2) [sample/symbol] each. The data interpolating unit 14 does not interpolate when the sampling speed is high.

A data judging unit 15 extracts the Nyquist point of the reception data interpolated by the data interpolating unit 14 by using the timing error τ entered from the timing reproducing unit 4, and outputs the judged value of the reception data at this extracted Nyquist point as demodulated data D1.

On the other hand, the timing reproducing unit 4 has a transmission complex symbol frequency generator 5, and the transmission complex symbol frequency generator 5 has an envelope detector 6 and an amplitude change amount detector 7. The envelope detector 6 outputs an envelope signal E(t) showing an envelope of the received base band signal Sb, from the in-phase data series $I_i$ and orthogonal data series $Q_i$, according to equation (10).

$$E(t)=(I(t)^2+Q(t)^2)^{1/2} \quad (10)$$

The amplitude change amount detector 7 calculates and outputs the amplitude change amount signal D(t) of the received base band signal Sb, from the in-phase data series $I_i$ and orthogonal data series $Q_i$, according to equation (11).

$$D(t)=((I(t)-I(t-T/2))^2+((Q(t)-Q(t-T/2))^2)^{1/2} \quad (11)$$

The envelope signal E(t) and amplitude change amount signal D(t) both have the symbol frequency component fs. The phase difference of the envelope signal E(t) and amplitude change amount signal D(t) is always π/2. The timing reproducing unit 4, making use of these features, estimates the timing phase at high precision and high speed, same as in the prior art, at a sampling speed of two times (n=2) of symbol rate.

Figure 2:
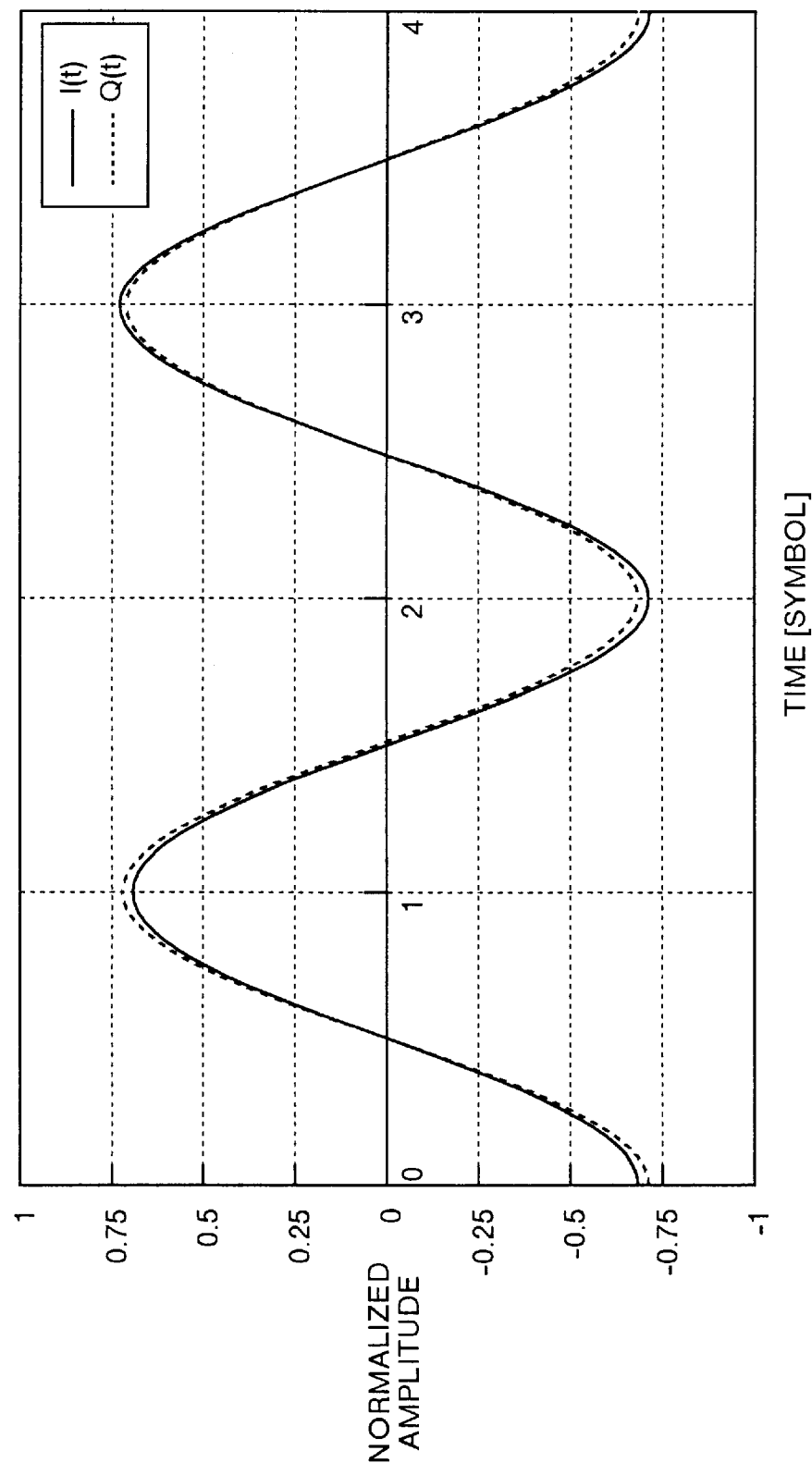
FIG. 2 is a waveform diagram of 0π modulation signal at carrier phase of 45 degrees.
Figure 3:
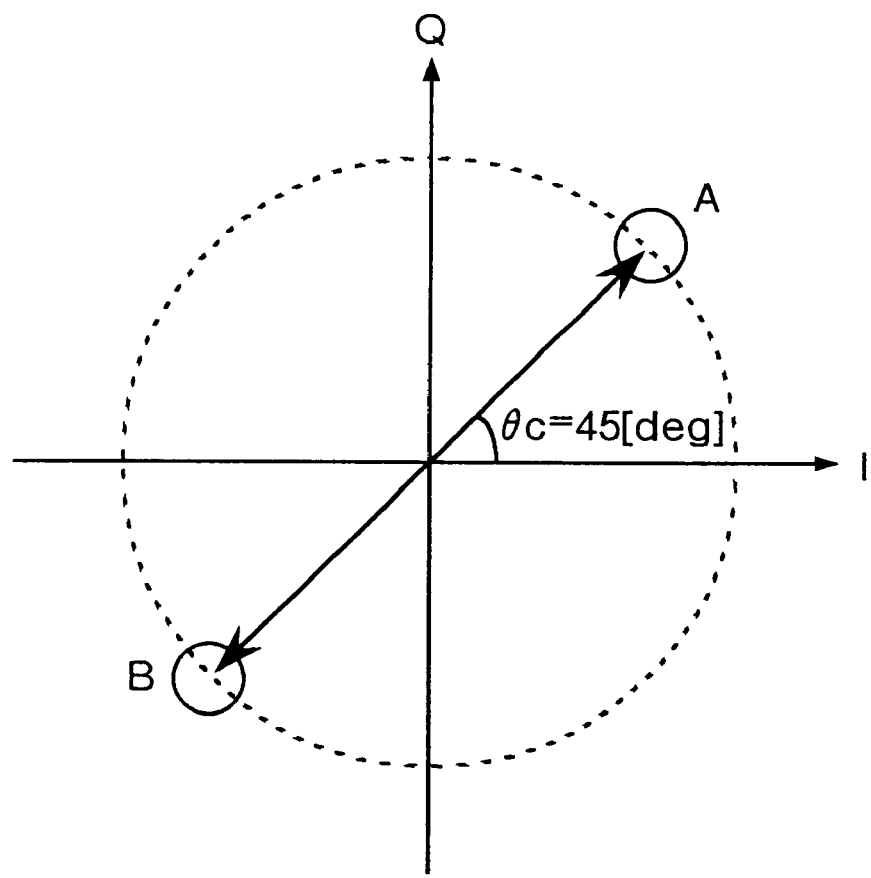
FIG. 3 is a diagram showing signal transition of 0π modulation signal.

Suppose the received base band signal Sb is a "0π" modulation signal used widely as preamble pattern for timing reproduction. FIG. 2 is a wave form diagram of "0π" modulation signal when the carrier phase is 45 degrees. In FIG. 2, the axis of abscissas denotes the time in the symbol unit, and the Nyquist point time tn is tn=iT (where i=0, 1, 2, 3, . . . ). As mentioned above, T is the symbol period. The axis of ordinates shows the amplitude when normalized with the envelope level of received base band signal. Therefore, this "0π modulation signal shifts symmetrically to the original in every symbol in the system of orthogonal coordinates as shown in FIG. 3.

Figure 4:
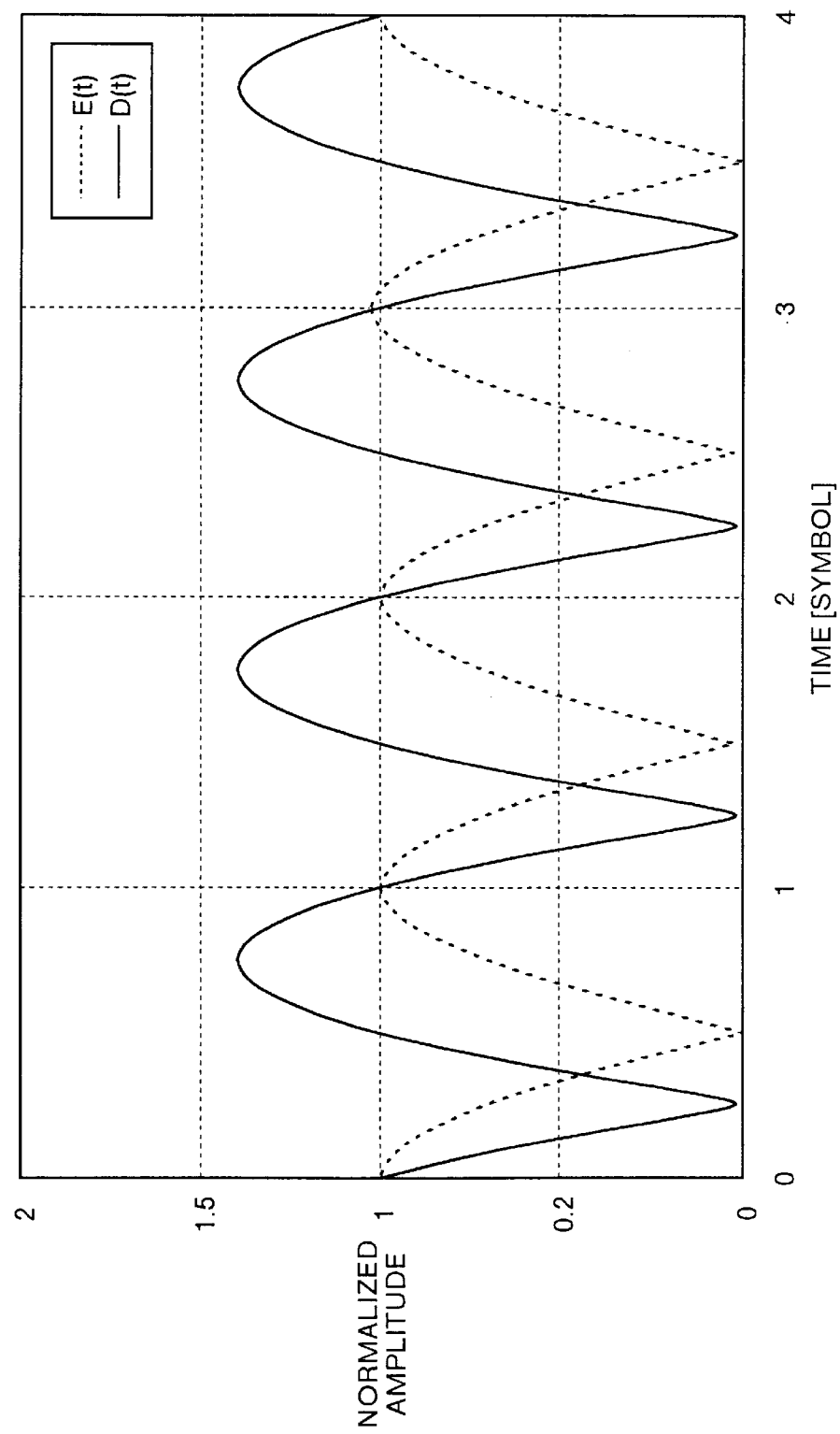
FIG. 4 is a waveform diagram of envelope signal E(t) and amplitude change amount signal D(t) corresponding to 0π modulation signal shown in FIG. 2 and FIG. 3.

When this 0π" modulation signal is operated according to equation (10), an envelope signal E(t) as shown in FIG. 4 is obtained. The envelope signal E(T) shows the maximum value at the Nyquist point time tn=iT, and shows the minimum value at time t=iT +T/2. On the other hand, when the "0π" modulation signal is operated according to equation (11), the amplitude change amount signal D(t) shown in FIG. 4 is obtained. The change amount of the envelope is maximum at time t=iT +T/4 and time t=iT +3T/4, and is minimum at time t=iT +3T/4 and time t=iT +5T/4. Therefore, the amplitude change amount signal D(t) is maximum at time t=ikT+3T/4, and minimum at time t=iT +T/4.

Supposing the envelope level at the Nyquist point to be E, the envelope signal E(t) and amplitude change amount signal D(t) have signal components Es(t) and Ds(t) as shown in equation (12) and equation (13), respectively.

$$Es(t)=(E/2)\cos(2\pi \cdot fst)+E/2 \quad (12)$$

$$Ds(t)=-(\sqrt{(2)}E/2)\sin(2\pi \cdot fst)+\sqrt{(2)}E/2) \quad (13)$$

Since the amplitude ratio of signal components Es(t) and Ds(t) is Es(t):DS(t)=1:√(2), when the amplitude change amount signal D(t) is weighted with 1/√(2),the weighted amplitude change amount signal DW(t) may be expressed as in equation (14).

$$DW(t)=D(t)/\sqrt{(2)} \quad (14)$$

Figure 5:
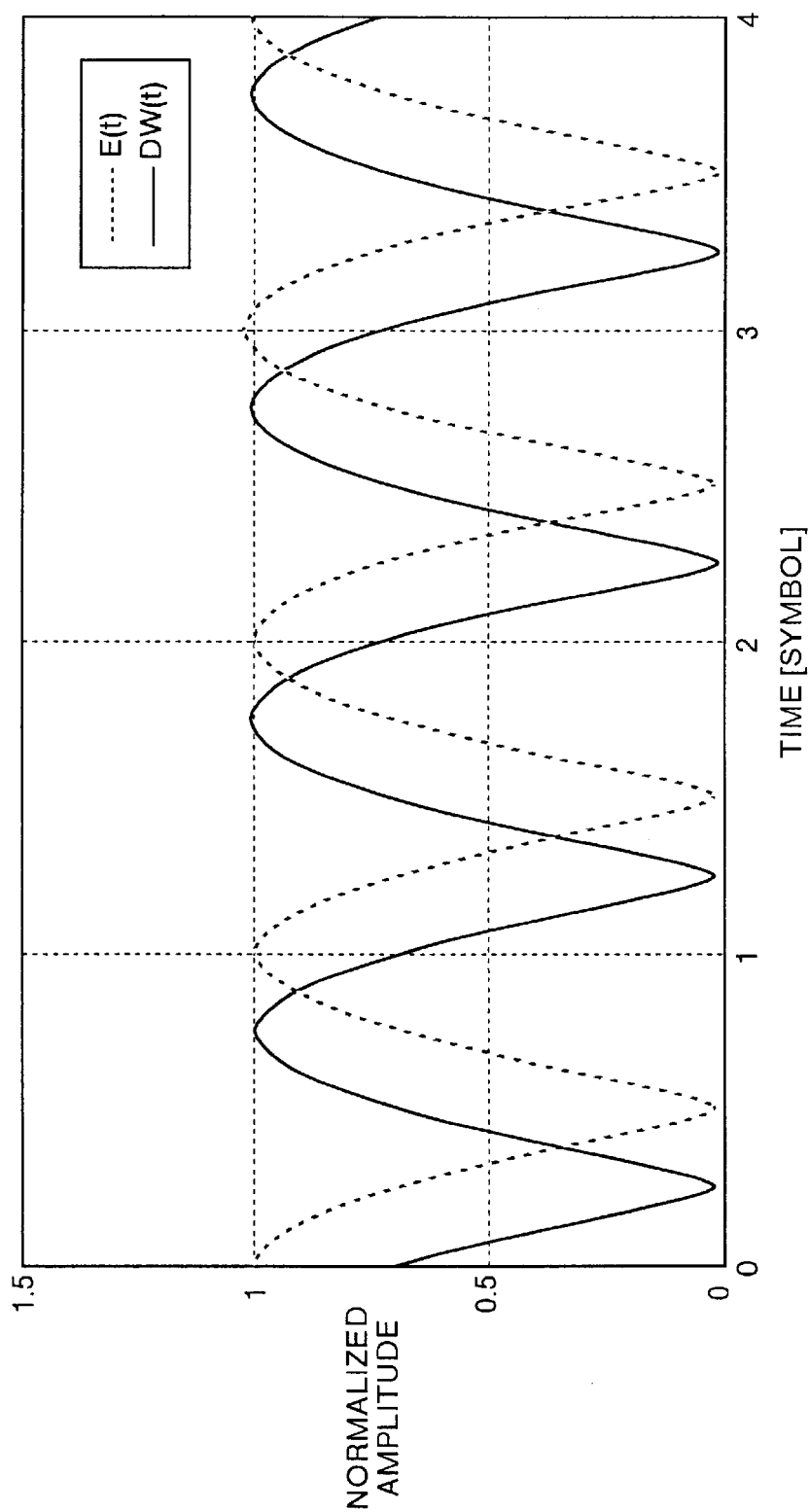
FIG. 5 is a waveform diagram of envelope signal E(t) and weighted amplitude change amount signal DW(t) corresponding to 0π modulation signal shown in FIG. 2 and FIG. 3.

By thus weighting, the amplitude component of the amplitude change amount signal DW(t) and amplitude component of the envelope signal E(t) are equal to each other as shown in FIG. 5. The signal component DWs(t) of the amplitude change amount signal DW(t) at this time is as expressed in equation (15).

$$DWs(t)=-(E/2)\sin(2\pi \cdot fst)+E/2 \quad (15)$$

On the other hand, since the relation of cosine and sine is established between the envelope signal E(t) and amplitude change amount signal DW(t) having these symbol frequency components, that is, signal components Es(t) and DWs(t), when expressed by the complex signal S(t)=E(t)+jDW(t), using the envelope signal E(t) as in-phase component and amplitude change amount signal DW(t) as orthogonal component, the complex signal S(t) has the transmission side symbol frequency component exp [−j(2π·fst)].

Figure 6:
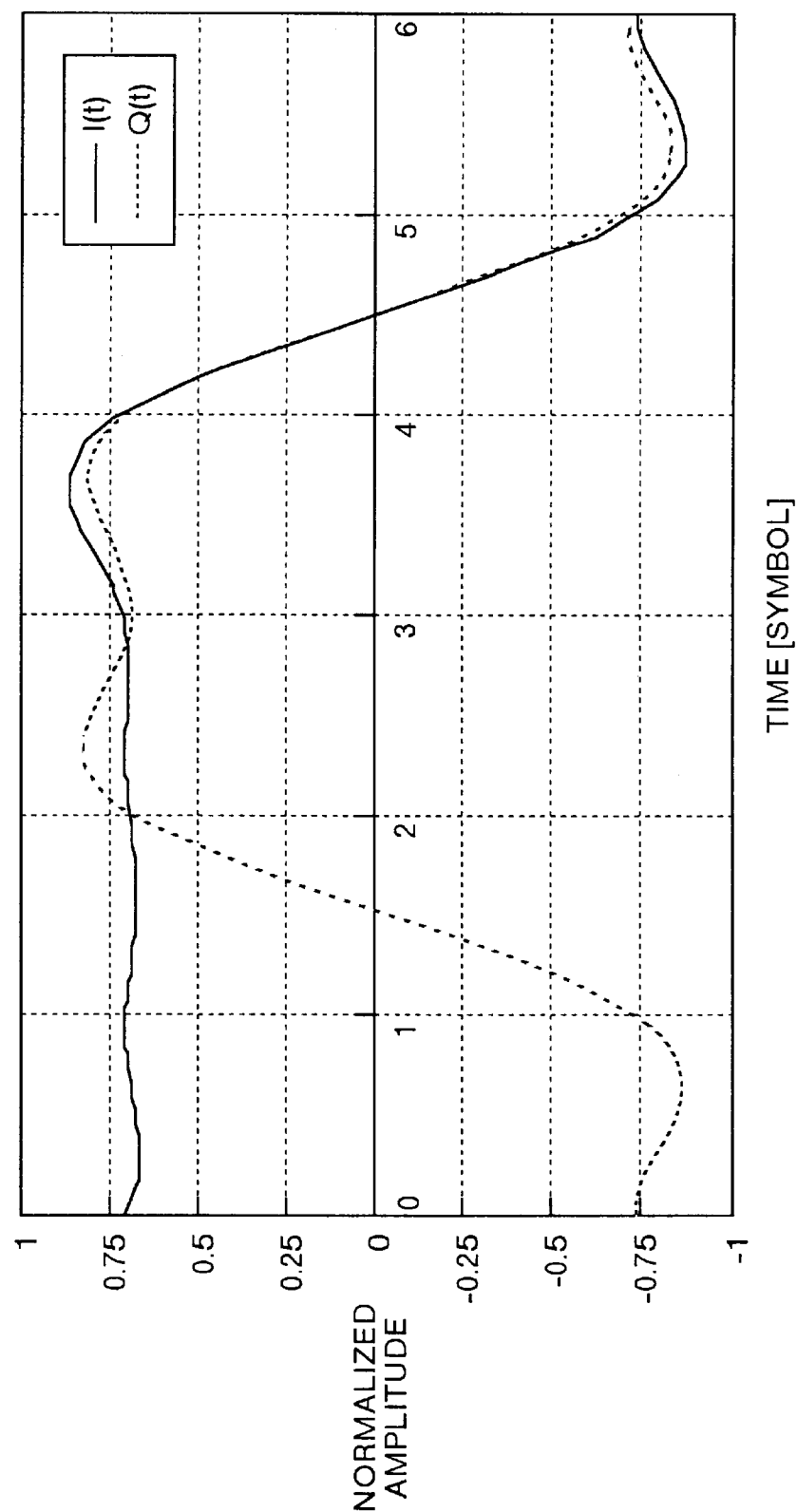
FIG. 6 is a waveform diagram showing an example of received base band signal of QPSK modulated random pattern at carrier phase of 45 degrees.

Not limited to the "0π" modulation signal, for example, when receiving a received base band signal Sb of QPSK modulated random pattern, the envelope signal E(t) and amplitude change amount signal DW(t) respectively have the symbol frequency component. For example, FIG. 6 is a wave form diagram showing an example of received base band signal Sb of QPSK modulated random signal when the carrier phase is 45 degrees, and FIG. 7 is a waveform diagram showing the envelope signal E(t) and amplitude change amount signal DW(t) generated from the received base band signal Sb of random pattern shown in FIG. 6.

Figure 7:
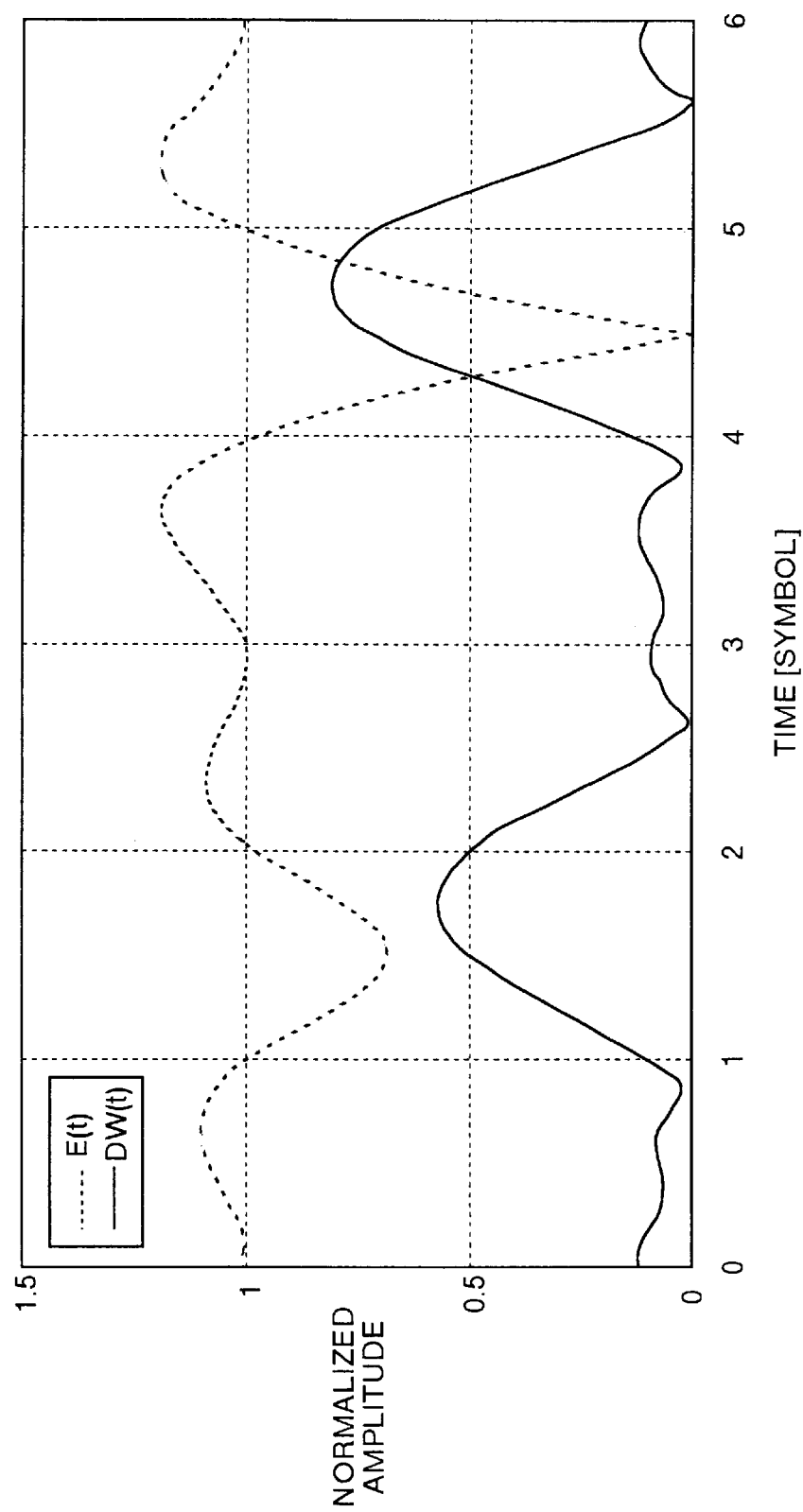
FIG. 7 is a waveform diagram of envelope signal E(t) and amplitude change amount signal DW(t) by the received base band signal of random pattern shown in FIG. 6.

Presence or absence of symbol frequency component contained in the envelope signal E(t) and amplitude change amount signal DW(t) shown in FIG. 7 cannot be judged immediately, but it is known that the symbol frequency component is contained by averaging the amplitude value of every symbol period by using the envelope signal E(t) and amplitude change amount signal DW(t) shown in FIG. 7 and the following equations (16) and (17).

$$ME(\tau) = \sum_{i=-N}^{N} E(iT + \tau)/(2N + 1) \quad (16)$$

$$MDW(\tau) = \sum_{i=-N}^{N} DW(iT + \tau)/(2N + 1) \quad (17)$$

Figure 8:
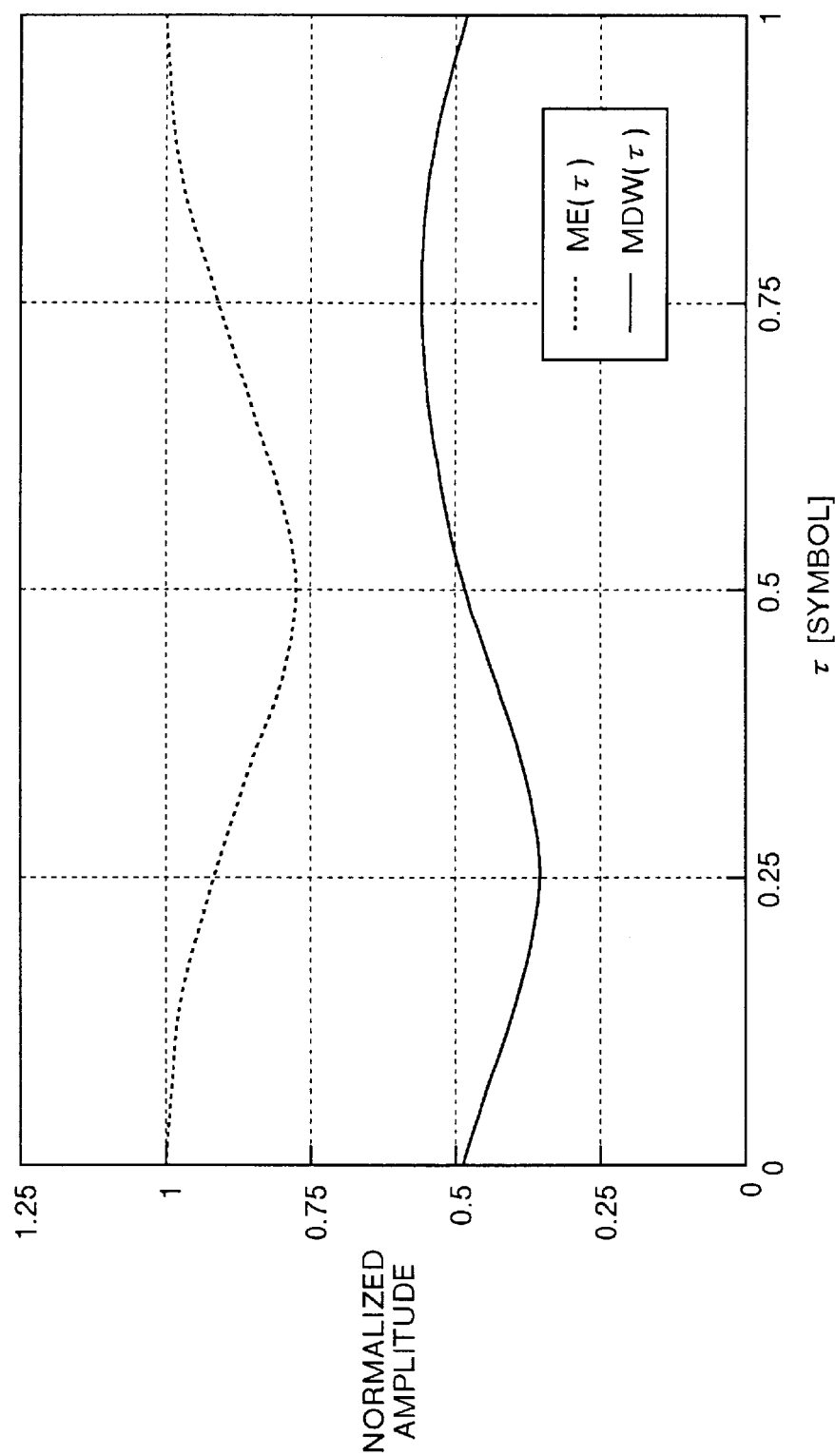
FIG. 8 is a waveform diagram of signal ME (τ) and signal MDE (τ) obtained based on the received base band signal of random pattern shown in FIG. 6.

FIG. 8 is a waveform diagram showing signal ME(τ) and signal MDW(τ) obtained from the envelope signal E(t) and amplitude change amount signal DW(t) shown in FIG. 7 by operation according to the equations (16) and (17). The signal ME(τ) and signal MDW(τ) shown in FIG. 8 are the results by averaging at N=50 (symbol) each. As a result, the signal ME(τ) and signal MDW(τ) have the symbol frequency component, and it is known that the phase difference is π/2. Therefore, even when receiving the received base band signal Sb of QPSK modulated random pattern, same as in the case of "0π" modulation signal, there is a symbol frequency component with cosine and sine characteristics with a period of 1 symbol. That is, the complex signal S(t)=E(t) +jDW(t) of the received base band signal Sb of QPSK modulated random pattern also has the transmission side symbol frequency component exp [−j(2π·fst)].

The envelope detector 6 outputs the envelope signal E(t), and the amplitude change amount detector 7 outputs the amplitude change amount signal DW(t), and therefore the transmission complex symbol frequency generator 5 outputs the complex signal S(t)=E(t)+jDW(t) having the transmission side complex symbol frequency component to the correlation value calculator 10.

The correlation value calculator 10 calculates the correlation between the complex signal S(t) of envelope signal E(t) and amplitude change amount signal DW(t), and the cosine wave C(t)=cos(2π·fst+Δθ) synchronized with the asynchronous sampling clock CK according to equation (18), and determines the correlation value SM (N). The timing phase error Δθ is the phase difference of the Nyquist point and asynchronous sampling clock CK.

$$SM(N) = \int_{-N/2}^{N/2} S(t)\cos(2\pi \cdot fst + \Delta\theta)\,dt \quad (18)$$

An inverse tangent calculator 11 determines the vector angle Δθ of the correlation value SM(N), and outputs a timing error τ to the data judging unit 15 from this vector angle Δθ. A vector length calculator 12 determines the vector length $V_i$ indicated by the correlation value SM(N). A comparator 13 compares the vector length $V_i$ and threshold ε, and when the vector length $V_i$ is larger than the threshold ε, it is judged that the burst signal has been received, and signal detection information D2 of logic "1" is issued, and when the vector length $V_i$ is smaller than the threshold ε, it is judged that no signal has been received, and signal detection information D2 of logic "0" is issued.

The above explanation relates to continuous signal processing on the time axis, and below is explained a discrete signal processing in the case that the asynchronous sampling clock CK is two times (n=2) of symbol rate.

First, the A/D converter 3a samples the received base band signal Sb at time t (=τ+iT/2), by using an asynchronous sampling clock CK having a frequency of two times (n=2) of symbol rate issued from the oscillator 8, and outputs the in-phase component of the sampled received base band signal Sb as in-phase data series $I_i$. Similarly, the A/D converter 3b samples the received base band signal Sb at time t (=τ+iT/2), by using an asynchronous sampling clock CK having a frequency of two times of symbol rate issued from the oscillator 8, and outputs the orthogonal component of the sampled received base band signal Sb as orthogonal data series $Q^i$.

The envelope detector 6 outputs the envelope data series $E_i$ showing the envelope of the received base band signal Sb from the in-phase data series $I_i$ and orthogonal data series $Q_i$ according to the following equation (19).

$$Ei = ((Ii)^2 + (Qi)^2)^{1/2} \quad (19)$$

The amplitude change amount detector 7 detects the change amount of the received base band signal Sb from the in-phase data series $I_i$ and orthogonal data series $Q_i$ according to equation (20), and outputs as amplitude change amount data series $D_i$.

$$Di = ((I-I_{i-1})^2 + (Q-Q_{i-1})^2 \quad (20)$$

Further, the amplitude change amount detector 7 weights, as required, the amplitude change amount data series $D_i$ with weighting value α according to equation (21), and outputs a weighted amplitude change amount data series $DW_i$.

$$DWi = \alpha \cdot DI_i \quad (21)$$

By this weighting, the envelope data series $E_i$ and amplitude change amount data series D1 can be matched in the amplitude value indicated by each data series. For example, the amplitude change amount detector 7 outputs by weighting with a weighting value α of "1/√(2)". Without weighting, the amplitude change amount data series $DW_i$ is equal to the amplitude change amount data series $D_i$. If not weighted, the error of the timing phase estimation increases, but the circuit for weighting process is not needed, so that the operation processing and circuit scale of the timing reproducing unit 4 can be reduced.

When calculating according to equation (21), the amplitude value of the envelope data series $E_i$ is multiplied by the weighting value α in order that the amplitude change amount detector 7 may be matched with the amplitude value of the amplitude change amount data series $D_i$, but, to the contrary, in order that the envelope detector 6 may be matched with the envelope data series $E_i$, the amplitude value of the amplitude change amount data series $D_i$ may be multiplied by the weighting value α. Instead of the envelope detector 6 or amplitude change amount detector 7, the correlation value calculator 10 may be made to perform the weighting.

In the process in the envelope detector 6 and amplitude change amount detector 7 according to equations (19) and (20), the square operation and square root operation are processed, but as shown in equations (22) and (23), by square operation processing only, the engineering-equivalent envelope data series $E_i$ and amplitude change amount data series $D_i$ may be determined.

$$E_i = (I_i)^2 + (Q_i)^2 \quad (22)$$

$$D_i = (I-I_{i-1})^2 + (Q-Q_{i-1})^2 \quad (23)$$

Further, the envelope detector 6 and amplitude change amount detector 7 may determine the engineering-equivalent envelope data series $E_i$ and amplitude change amount data series $D_i$ by addition and subtraction operation only as shown equations (24) and (25) respectively.

$$E_i = |I_i| + |Q_i| \quad (24)$$

$$D_i = |I_i - I_{i-1}| + |Q_1 - Q_{i-1}| \quad (25)$$

The oscillator 8 outputs an asynchronous sampling clock CK having a frequency of n (n=2) times of symbol rate. A cosine wave generator 9 divides the asynchronous sampling clock CK issued from the oscillator 8, and outputs cosine wave data series $C_i$ of which frequency is symbol frequency fs (=1/T), according to equation (26).

$$C_i = \cos(2\pi \cdot fsiT/2) \quad (26)$$
$$= \cos(\pi i)$$
$$= +1, -1, +1, -1, \ldots$$

The correlation value calculator 10 multiplies the envelope data series $E_i$ and amplitude change amount data series each by cosine wave data series $C_i$ according to equations

(27) and (28), and determines multiplication data series $XE_i$, $XD_i$, respectively.

$$XE_i = E_i \times C_i \quad (27)$$

$$XD_i = D_i \times C_i \quad (28)$$

The correlation value calculator 10 averages the multiplication data series $XE_i$, $XD_i$ each, and determines the correlation between the complex data series ($E_i$–$jD_i$) as transmission side complex symbol frequency component, and the reception side cosine wave data series $C_1$. This averaging process may be realized, for example, by FIR filter or IIR filter.

When using the FIR filter, the correlation data series $SM_i=(CI_i, SI_i)$ is determined according to equations (29) and (30). In the equations, N is a parameter for determining the time constant of the FIR filter. Herein, the greater the value of the parameter N, the larger becomes the time constant.

$$CI_i = \sum_{j=-N}^{N} XE(i+j)/(2N+1) \quad (29)$$

$$SI_i = \sum_{j=-N}^{N} XD(i+j)/(2N+1) \quad (30)$$

On the other hand, when using the IIR filter, the correlation data series $SM_i=(CI_i, SI_i)$ is determined according to equations (31) and (32). In the equations, β is an oblivious coefficient, being less than 1, which is a parameter for determining the time constant of the IIR filter. Here, the greater the value of the parameter β, the larger becomes the time constant.

$$CI_i = \beta CI_{i-1} + XEi \quad (31)$$

$$SI_i = \beta SI_{i-1} + XEi \quad (32)$$

The inverse tangent calculator 11 determines the vector angle Δθ of the correlation data series $SM_i=(CI_i, SI_i)$ according to equation (33).

$$\Delta\theta = \tan^{-1}(SI_i/CI_i) \quad (33)$$

Further, based on the vector angle Δθ, the inverse tangent calculator 11 determines and outputs the timing error τ.

The timing reproducing unit 4 processes as mentioned above when the reception timing of the burst signal is known, but when the reception timing of burst signal is unknown and it is required to establish the burst timing synchronism of the burst signal, the burst signal is detected, and the burst timing can be established based on the detected information. In this case, the vector length calculator 12 in the timing reproducing unit 4 determines and outputs the vector length $V_i$ indicated by the correlation data series $SM_i=(CI_i, SI_i)$ issued by the correlation value calculator 10, according to equation (34).

$$V_i = (CI_i^2 + SI_i^2)^{1/2} \quad (34)$$

The comparator 13 compares the vector length $V_i$ and threshold ε, and when the vector length $V_i$ is larger than the threshold ε, it is judged that the burst signal has been received, and signal detection information D2 of logic "1" is issued, and when the vector length $V_i$ is smaller than the threshold ε, it is judged that no signal has been received, and signal detection information D2 of logic "0" is issued.

In the foregoing first embodiment, the sampling speed by the asynchronous sampling clock CK is two times (n=2) of the symbol rate, but the sampling speed is not specified as far as satisfying the relation of n≧2.

In the first embodiment, the received base band signal Sb is explained as a random pattern signal of "0π" modulation or QPSK modulation, but any other received base band signal Sb may be used as far as the envelope of the received base band signal Sb and the change amount of the received base band signal Sb on the complex plane both have characteristics of repeating increase and decreased in symbol period in average, and the phase relation of the envelope and change amount of the received base band signal Sb thus repeating increase and decrease satisfies the relation of (cosine, sine) or (cosine, –sine). For example, BPSK modulated signal, or π/4 shift QPSK modulated signal may be also used as received base band signal Sb.

According to the first embodiment, even in the case of digital signal sampled at a double sampling speed of symbol rate, the phase can be pulled in at high speed timing same as in the case of sampling at sample speed of more than four times of symbol rate, by using the envelope signal E(t) (envelope data series $E_i$) and amplitude change amount signal DW(t) (amplitude change amount data series $D_i$) issued by the envelope detector 6, and the phase jitter after phase pull-in can be decreased. Not only the preamble signal such as 0π modulation signal but also random pattern signal can realize high speed timing phase pull-in and low phase jitter at double sampling speed of symbol rate.

It is only enough to sample the received base band signal at double sampling speed of symbol rate, and therefore the data transmission speed can be relatively enhanced as compared with the conventional timing reproducing apparatus for sampling the reception base bad signal at sample speed of more than four times of symbol rate or demodulating apparatus using the same, and the data transmission speed required in the wide-band radio communication system can be satisfied.

In the timing reproducing apparatus of the first embodiment or the demodulating apparatus using the same, the sampling speed of the A/D converter or the operating speed in the demodulating apparatus required to be only ½ of the conventional case, and lower power consumption and lower price are realized in the wide-band radio communication system. Herein, lower price means saving of time, labor and cost of parts required in fabrication of the timing reproducing apparatus or the demodulating apparatus using the same. Such lower power consumption or lower price is possible because, for example, an inexpensive A/D converter lower in the upper limit of sampling speed can be used, or the demodulating apparatus can be manufactured by using CMOS and other devices lower in the upper limit of operating speed, instead of the ECL higher in the upper limit of the operating speed.

In the first embodiment, even in the case of the data having the received base band signal sampled at a double speed of symbol rate, the burst signal can be detected by the vector length detector 12 and comparator 13, so that the burst timing may be established.

A second embodiment of the present invention will now be explained. In the foregoing first embodiment, it is assumed that the signal entered in the timing reproducing unit 4 is linearly controlled in level by an AGC (automatic gain control) amplifier, but in this second embodiment, whether the input signal in the timing reproducing unit 4 is linearly controlled in level by the AGC amplifier, or non-linearly amplified at a constant level by a limiter amplifier, it is designed to estimate the timing error.

That is, in the first embodiment, the timing error τ was determined by using the envelope of reception base band and amplitude change amount, but in the case of hard-limited signal amplified nonlinearly at a constant level by an inexpensive limiter amplifier, the envelope presents a constant value, and fluctuations of symbol period as shown in FIG. 4 do not occur periodically, so that the timing reproducing unit 4 cannot estimate normal timing error. In the second embodiment, the timing reproducing unit 4 is designed to estimate normal timing error even in the case of using a limiter amplifier.

Figure 9:
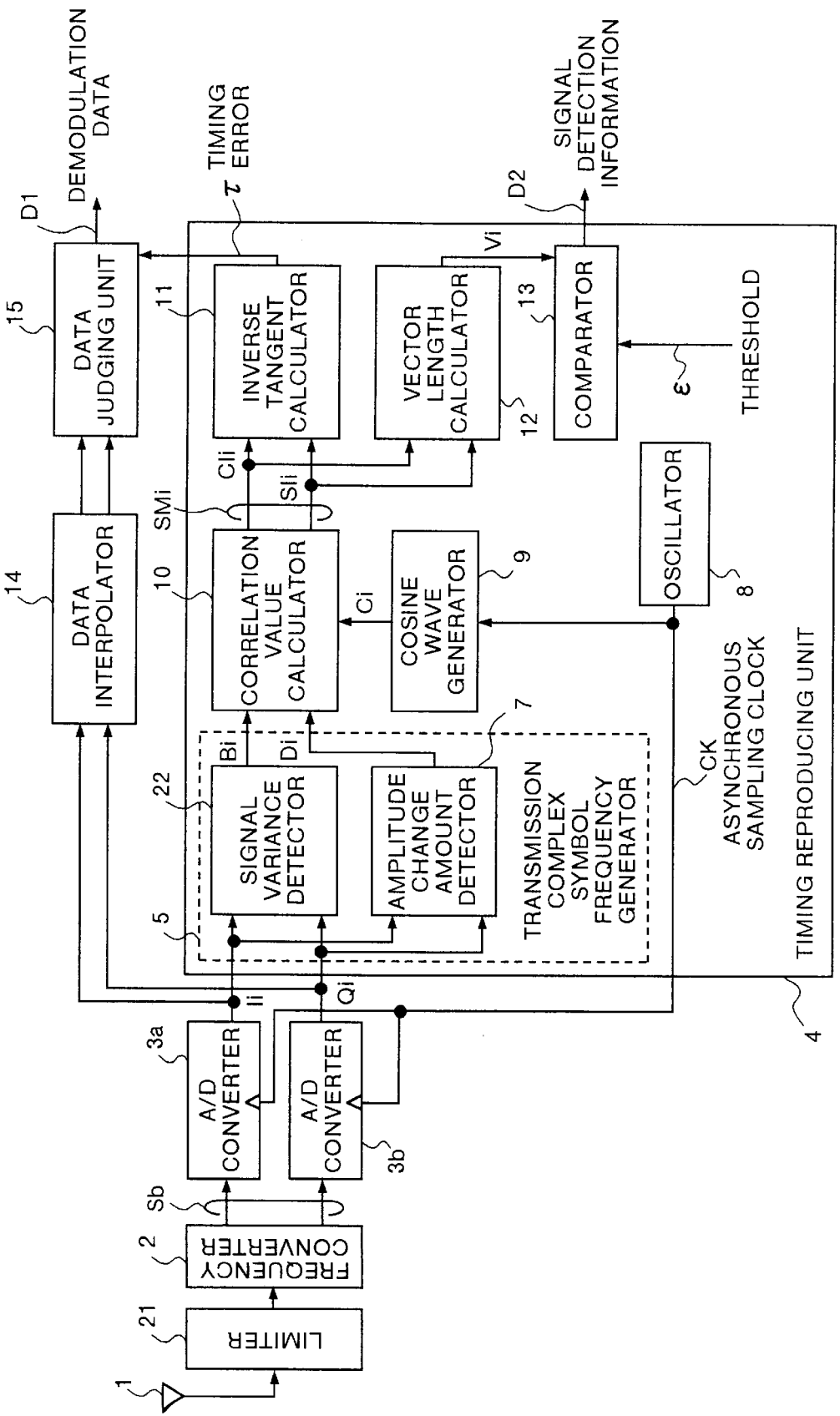
FIG. 9 is a block diagram showing a part of configuration of a timing reproducing apparatus according to a second embodiment of the invention, and a receiver of digital radio communication system comprising a demodulating apparatus using the same.
Figure 10:
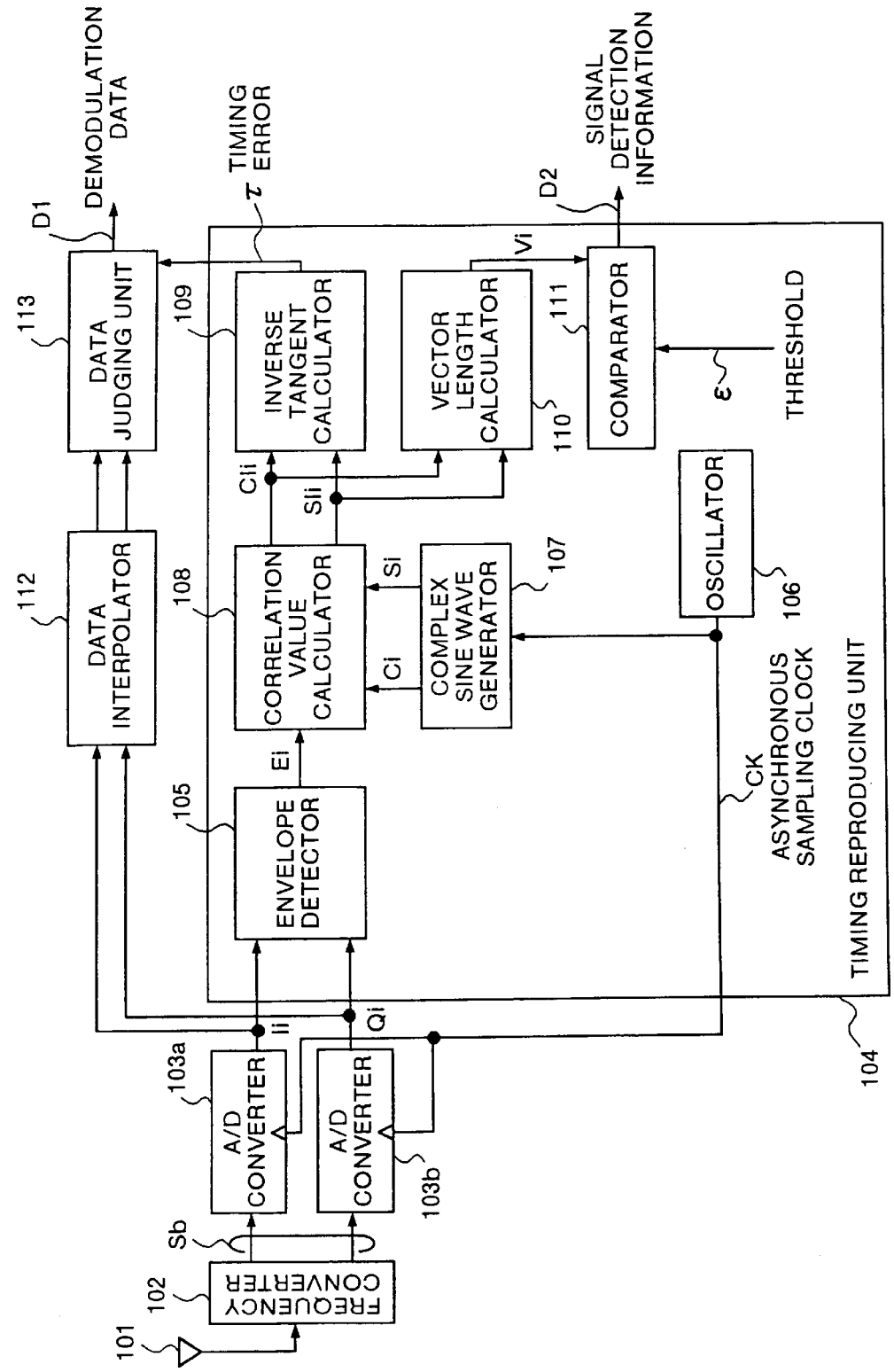
FIG. 10 is a block diagram showing a part of configuration of receiver of digital radio communication system comprising a demodulator including a conventional timing reproducing unit.

FIG. 9 is a block diagram showing apart of configuration of the timing reproducing apparatus in the second embodiment of the invention, and a receiver of a digital radio communication system comprising a demodulating apparatus using the same. In FIG. 9, in this receiver, a limiter 21 is further provided before the frequency converter 2, and a signal variance detector 22 is provided instead of the envelope detector 6 in the timing reproducing unit 4, and the other structure is same as the receiver shown in FIG. 1, and the same components are identified with same reference numerals.

In FIG. 9, an antenna 1 receives a burst signal in a PSK modulated RF (radio frequency) band. The limiter 21 nonlinearly amplifies the RF band reception signal entered from the antenna 1, and hard-limits the reception signal at a constant level, then outputs a constantly enveloped reception signal to the frequency converter 2. The frequency converter 2 converts the constantly enveloped reception signal into a base band signal Sb. The limiter 21 is provided before the frequency converter 2, but when converting the RF band reception signal into a base band reception signal inside the frequency converter 2, if it is once converted into an intermediate frequency (IF) band reception signal, the limiter 21 may be provided in the frequency converter 2, and this IF band reception signal may be hard-limited to a constant level, and a constantly enveloped IF band reception signal may be generated.

An A/D converter 3a, using an asynchronous sampling clock CK having a frequency of two (n=2) times of symbol rate issued from an oscillator 8, samples the received base band signal Sb at time t (=τ+iT/2), and outputs the in-phase component of the sampled received base band signal Sb as in-phase data series $I_i$. Similarly, an A/D converter 3b, using an asynchronous sampling clock CK having a frequency of two times of symbol rate issued from the oscillator 8, samples the received base band signal Sb at time t (=τ+iT/2), and outputs the orthogonal component of the sampled received base band signal Sb as orthogonal data series $Q_i$.

The timing reproducing unit 4 calculates a timing error τ from the in-phase data series $I_i$ and orthogonal data series $Q_i$. On the other hand, a data interpolating unit 14 is used when the sampling speed is low, and the reception data composed of in-phase data series $I_i$ and orthogonal data series $Q_i$ sampled by the asynchronous sampling clock CK with time resolution of 2 [sample/symbol] is issued by interpolating with the reception data having a time resolution n'(n'>2) [sample/symbol] each. The data interpolating unit 14 does not interpolate when the sampling speed is high.

A data judging unit 15 extracts the Nyquist point of the reception data interpolated by the data interpolating unit 14 by using the timing error τ entered from the timing reproducing unit 4, and outputs the judged value of the reception data at this extracted Nyquist point as demodulated data D1.

On the other hand, the timing reproducing unit 4 has a transmission complex symbol frequency generator 5, and the transmission complex symbol frequency generator 5 has the signal variance detector 22 and an amplitude change amount detector 7. The signal variance detector 22 generates signals Im(t), Qm(t) multiplied by $2^m$ times from the in-phase signal I(t) and orthogonal signal Q(t), according to equations (35) and (36) when the received base band signal Sb is $2^m$-times PSK modulated base band signal.

$$Im(t)=(I(t)^2+Q(t)^2)^{1/2}\cos \theta m(t) \tag{35}$$

$$Qm(t)=(I(t)^2+Q(t)^2)^{1/2}\sin \theta m(t) \tag{36}$$

where θm(t) is $$\theta m(t)=2^m \times \tan^{-1} (Q(t)/I(t)) \bmod 2\pi \tag{37}$$

In this case, the $2^m$-times multiplied signals Im(t) and Qm(t) always converge at a point on a complex plane, at Nyquist point time tn, whether the reception signal is random pattern or fixed pattern such as preamble if the noise component is ignored. At other than Nyquist point time tn, not always converging at a point on the complex plane, the variance of point scatters as departing from the Nyquist point time tn, and the variance reaches the maximum at time T/2 from the Nyquist point time tn. This property of convergence or variance is established also when the reception signal is constantly enveloped by the limiter 21.

Therefore, the signal variance detector 22 determines the variance signal B(b) showing variance described above, according to the following equation (38) based on the change amount in one symbol of $2^m$-times multiplied signals Im(t) and Qm(t).

$$B(t)=((Im(t)-Im(t-T))^2+(Qm(t)-Qm(t-T))^2)^{1/2} \tag{38}$$

The variance signal B(t) indicates "0" in average at Nyquist point time tn, and shows the maximum at time T/2 from the Nyquist point time tn. This variance characteristic is, unlike the envelope signal E(t), maintained if the reception signal is constantly enveloped by the limiter 21.

That is, the variance signal B(t) possesses, in average, the signal component Bs(t) shown in the following equation (39).

$$Bs(t)=-)Ax/2)\cos(2\pi \cdot fst)+Ax/2 \tag{39}$$

Herein, "Ax/2" is an amplitude value, and this value differs with the modulation system or data pattern to be received. Incidentally, the relation between the phase of the signal component Bs(t) and the phase of the signal component Es(t) which is a symbol frequency component included in the envelope signal E(t) is deviated by π radian.

Therefore, by generating a complex signal $S_2(t)$ as shown in equation (40), by combining the variance signal B(t) and the amplitude change amount signal DW(t) issued from the amplitude change amount detector 7 and weighted so as to be matched in amplitude with this variance signal B(t), the complex signal $S_2(t)$ has a transmission side symbol frequency component exp $(9j(2\pi \cdot fst+n))$.

$$S_2(t)=B(t)+jDW(t) \tag{40}$$

The correlation value calculator 10 calculates the correlation between the complex signal $S_2(t)$ and the cosine wave $C(t)=\cos(2\pi \cdot fst+\Delta\theta)$ issued from the cosine wave generator 9 and synchronized with the reception side asynchronous sampling clock CK according to the following equation (41), and determines the correlation value $SM_2$ (N). The timing phase error $\Delta\theta$ is the phase difference between the Nyquist point and asynchronous sampling clock CK.

$$SM_2(N) = \int_{-N/2}^{N/2} S_2(t)\cos(2\pi \cdot fst + \Delta\theta)\,dt \qquad (41)$$

An inverse tangent calculator 11 determines the vector angle $\Delta\theta$ of the correlation value $SM_2(N)$, and outputs a timing error $\tau$ to the data judging unit 15 from this vector angle $\Delta\theta$. A vector length calculator 12 determines the vector length $V_i$ indicated by the correlation value $SM_2(N)$. A comparator 13 compares the vector length $V_i$ and threshold $\epsilon$, and when the vector length $V_i$ is larger than the threshold $\epsilon$, it is judged that the burst signal has been received, and signal detection information D2 of logic "1" is issued, and when the vector length $V_i$ is smaller than the threshold $\epsilon$, it is judged that no signal has been received, and signal detection information D2 of logic "0" is issued.

The above explanation relates to continuous signal processing on the time axis, and below is explained a discrete signal processing in the case that the asynchronous sampling clock CK is two times (n=2) of symbol rate.

First, the A/D converter 3a samples the received base band signal Sb at time t (=$\tau$+iT/2), by using an asynchronous sampling clock CK having a frequency of two times (n=2) of symbol rate issued from the oscillator 8, and outputs the in-phase component of the sampled received base band signal Sb as in-phase data series $I_i$. Similarly, the A/D converter 3b samples the received base band signal Sb at time t (=$\tau$+iT/2), by using an asynchronous sampling clock CK having a frequency of two times of symbol rate issued from the oscillator 8, and outputs the orthogonal component of the sampled received base band signal Sb as orthogonal data series $Q_i$.

The signal variance detector 22 determines the $2^m$-times multiplied data series $Im_i$, $Qm_i$, according to the following equations (42) and (43), from the in-phase data series $I_i$ and orthogonal data series $Q_i$.

$$Im_i = ((I_i)^2 + (Q_i)^2)^{1/2} \cos\theta m_i \qquad (42)$$

$$Qm_1 = ((I_i)^2 + (Q_i)^2)^{1/2} \sin\theta m_i \qquad (43)$$

where $\theta m_i$ is $$\theta m_i = 2^m \times \tan^{-1}(Q_i/I_i) \bmod 2\pi \qquad (44)$$

Further, the signal variance detector 22, using the $2^m$-times multiplied data series Im1, Qmi, determines the variance detection data series $B_i$ in equation (45), and outputs to the correlation value detector 10.

$$B_i = ((Im_i - Im_{i-2})^2 + (Qm_i - Qm_{i-2})^2)^{1/2} \qquad (45)$$

In the process in the signal variance detector 22 and amplitude change amount detector 7 according to equations (45) and (20), the square operation and square root operation are processed, but by square operation processing only, the engineering-equivalent variance detection data series $B_i$ and amplitude change amount data series $D_i$ may be determined. That is, the variance detection data series $B_i$ shown in equation (46) is determined.

$$B_i = ((Im_i - Im_{i-2})^2 + (Qm_i - Qm_{i-2})^2) \qquad (46)$$

Further, the signal variance detector 22 and amplitude change amount detector 7 may determine the engineering-equivalent signal variance data series $B_i$ and amplitude change amount data series $D_i$ by addition and subtraction operation only. That is, the variance detection data series $B_i$ shown in equation (47) is determined.

$$B_i = |Im_i - Im_{i-2}| + |Qm_i - Qm_{i-2}| \qquad (47)$$

Or, as shown in equation (48), the change amount of the phase data series $\theta m_i$ after $2^m$-times multiplication may be determined as the variance detection data series $B_i$. In this case, being free from effects of the carrier phase, by simple addition and subtraction processing only, the variance detection data series $B_i$ can be determined.

$$B_i \max\{|\theta m_i - \theta m_{i-2}|, 2\pi - |\theta m_i - \theta m_{i-2}|\} \qquad (48)$$

The amplitude change amount detector 7 may, using the phase data series $\theta d_i$ shown in equation (49) which is determined in the operation process of equation (44), determine the amplitude change amount data $D_i$ shown in equation (50).

$$\theta d_i = \tan^{-1}(Q_i/I_i) \qquad (49)$$

$$D_i = \max\{|\theta d_i - \theta d_{i-1}|, 2\pi - |\theta d_i - \theta d_{i-1}|\} \qquad (50)$$

In this case, the amplitude change amount data series $D_i$ is the phase change amount data series of ½ symbol. As a result, the amplitude change amount detector 7 can determine the amplitude change amount data series $D_i$ by simple addition and subtraction process only, without having effects of carrier phase.

The correlation value calculator 10 performs the same processing as in the first embodiment, except that the envelope data series $E_i$ is replaced by the variance detection data series $B_i$. That is, the correlation value calculator 10 outputs the correlation data series $SM_i = (CI_i, SI_i)$ by using the variance detection data series $B_i$ and the amplitude change amount data series $DW_i$ by weighting the amplitude change amount data series $D_i$. Instead, without weighting the amplitude change amount data series $D_i$, the variance detection data series $B_i$ may be weighted. Or, at the correlation value calculator 10 side, either the amplitude change amount data series $D_i$ or variance detection data series $B_i$ may be weighted. This weighting is same as in the first embodiment.

Incidentally, since the phase relation of the envelope data series $E_i$ and the variance detection data series $B_i$ is deviated by $\pi$ [radian], the vector angle $\Delta\theta$ indicated by the correlation data series $SM_i = (CI_i, SI_i)$ issued by the correlation value calculator 10 is the sum of the vector angle $\Delta\theta$ indicated by the correlation data series $SM_i = (CI_i, SI_i)$ issued by the correlation value calculator 10 in the first embodiment and $\pi$ [radian]. Accordingly, the inverse tangent calculator 11, when calculating the timing error $\tau$ from the vector angle $\Delta\theta$ indicated by the correlation data series $SM_i = (CI_1, SI_i)$ issued by the correlation value calculator 10, it processes in consideration of the phase deviation of $\pi$ [radian].

The timing reproducing unit 4 processes as mentioned above when the reception timing of the burst signal is known, but when the reception timing of burst signal is unknown and it is required to establish the burst timing synchronism of the burst signal, the burst signal is detected, and the burst timing can be established based on the detected information. In this case, the vector length calculator 12 in the timing reproducing unit 4 determines and outputs the vector length $V_i$ indicated by the correlation data series $SM_i = (CI_i, SI_i)$ issued by the correlation value calculator 10.

The comparator 13 compares the vector length $V_i$ and threshold $\epsilon$, and when the vector length $V_i$ is larger than the threshold $\epsilon$, it is judged that the burst signal has been received, and signal detection information D2 of logic "1" is issued, and when the vector length $V_i$ is smaller than the threshold $\epsilon$, it is judged that no signal has been received, and signal detection information D2 of logic "0" is issued.

In the foregoing second embodiment, the sampling speed by the asynchronous sampling clock CK is two times (n=2) of the symbol rate, but the sampling speed is not specified as far as satisfying the relation of n≧2.

Besides, the received base band signal is not limited, but may be any received base band signal as far as the variance of the signal point after $2^m$-times multiplication of the received base band signal and the change amount of the received base band signal on the complex plane both have characteristics of repeating increase and decreased in symbol period in average, and the phase relation of the characteristics thus repeating increase and decrease satisfies the relation of (cosine, sine) or (cosine, −sine). For example, BPSK modulated signal, or π/4 shift QPSK modulated signal may be also used as received base band signal.

According to the second embodiment, same action and effect as in the first embodiment are obtained, and even in the case of received base band signal constantly enveloped in RF band or IF band, by using the constantly enveloped received base band signal, the phase can be pulled in at high speed timing, and the phase jitter after phase pull-in can be decreased. Not only the preamble signal such as On modulation signal but also random pattern signal can realize high speed timing phase pull-in and low phase jitter at double sampling speed of symbol rate.

In particular, when using the AGC amplifier in the reception signal level control, the circuit is complicated and has many points to be adjusted, but in the second embodiment, since the limiter amplifier can be used, it is free from adjustment, and the demodulating apparatus can be simplified and reduced in size.

As described herein, according to the invention, the complex symbol frequency component generating unit generates a transmission side complex symbol frequency component from a received base band signal, and outputs as a transmission complex symbol frequency component signal, the correlation value calculating unit determines the correlation value between a cosine wave signal of a free-running symbol frequency generated at the reception side and the transmission complex symbol frequency component signal, and outputs this correlation value as a correlation signal, and the inverse tangent unit calculates a vector angle indicated by the correlation signal, and determines a phase timing error between the received base band signal and free-running symbol frequency based on the vector angle, thereby obtaining the demodulation timing at the Nyquist point based on this phase timing error. Accordingly, for example, if the received base band signal is sampled at a double sampling speed of symbol rate, the phase timing error can be obtained at high speed and high precision, and the data transmission speed can be relatively enhanced.

According to other aspect of the invention, the complex symbol frequency component generating unit generates a transmission side complex symbol frequency component from a received base band signal, and outputs as a transmission complex symbol frequency component signal, the correlation value calculating unit determines the correlation value between a cosine wave signal of a free-running symbol frequency generated at the reception side and the transmission complex symbol frequency component signal, and outputs this correlation value as a correlation signal, the inverse tangent unit calculates a vector angle indicated by the correlation signal, and determines a phase timing error between the received base band signal and free-running symbol frequency based on the vector angle, the vector length calculating unit calculates the vector length indicated by the correlation signal, and the comparing unit compares the vector length with a predetermined threshold, and outputs burst detection information showing detection of a burst signal when the vector length is longer than the predetermined threshold, thereby establishing the period of the burst timing, based on this burst detection information. Accordingly, for example, if the received base band signal is sampled at a double sampling speed of symbol rate, the phase timing error can be obtained at high speed and high precision, and the data transmission speed can be relatively enhanced, and the burst timing of the burst signal is established at the same time.

According to other aspect of the invention, the envelope detecting unit determines the envelope value of the received base band signal, and outputs the obtained envelope value as an envelope signal, and the amplitude change amount detecting unit determines the amplitude change amount in ½ symbol of the received base band signal, and outputs this amplitude change amount as an amplitude change amount signal, and the complex symbol frequency component generating unit outputs the complex signal combining the envelope signal and amplitude change amount signal as the transmission complex symbol frequency component signal. Accordingly, for example, if the received base band signal is sampled at a double sampling speed of symbol rate, the phase timing error can be obtained at high speed and high precision, and the data transmission speed can be relatively enhanced.

According to other aspect of the invention, the signal variance detecting unit multiplies the received base band signal by a predetermined number, determines the variance value of one symbol before and after the multiplied received base band signal, and outputs this variance value as a variance signal, and the amplitude change amount detecting unit determines the amplitude change amount in ½ symbol of the received base band signal, and outputs this amplitude change amount as an amplitude change amount signal, and the complex symbol frequency component generating unit outputs the complex signal combining the variance signal and amplitude change amount signal as the transmission complex symbol frequency component signal. Accordingly, for example, if the received base band signal is sampled at a double sampling speed of symbol rate, the phase timing error can be obtained at high speed and high precision, and the data transmission speed can be relatively enhanced, and moreover if the received base band signal is a nonlinearly amplified signal by a limiter amplifier, the phase timing error can be obtained at high speed and high precision.

According to other aspect of the invention, the envelope detecting unit outputs the square root of the sum of the square value of in-phase component of the received base band signal and the square value of orthogonal component of the received base band signal, as the envelope signal, and the amplitude change amount detecting unit outputs the square root of the sum of the square value of the difference between the in-phase component of the received base band signal and the in-phase component of the received base band signal of ½ symbol before, and the square value of the difference between the orthogonal component of the received base band signal and the orthogonal component of the received base band signal of ½ symbol before, as the amplitude change amount signal. Accordingly, the envelope signal for forming the complex symbol frequency component and the amplitude change amount signal can be obtained at high precision, and hence the timing phase can be estimated at high precision.

According to other aspect of the invention, the envelope detecting unit outputs the sum of the square value of in-phase component of the received base band signal and the square value of orthogonal component of the received base band signal, as the envelope signal, and the amplitude change amount detecting unit outputs the sum of the square value of the difference between the in-phase component of the received base band signal and the in-phase component of the received base band signal of ½ symbol before, and the square value of the difference between the orthogonal component of the received base band signal and the orthogonal component of the received base band signal of ½ symbol before, as the amplitude change amount signal. Thus, square root is not calculated when obtaining the envelope signal and the amplitude change amount signal for composing the complex symbol frequency component. Accordingly, the load required when calculating the complex symbol frequency component can be saved.

According to other aspect of the invention, the envelope detecting unit outputs the sum of the absolute value of in-phase component of the received base band signal and the absolute value of orthogonal component of the received base band signal, as the envelope signal, and the amplitude change amount detecting unit outputs the sum of the absolute value of the difference between the in-phase component of the received base band signal and the in-phase component of the received base band signal of ½ symbol before, and the absolute value of the difference between the orthogonal component of the received base band signal and the orthogonal component of the received base band signal of ½ symbol before, as the amplitude change amount signal. Thus, when obtaining the envelope signal and the amplitude change amount signal for composing the complex symbol frequency component, square root or square are not calculated but only the addition and subtraction are performed. Accordingly, the load required when calculating the complex symbol frequency component can be substantially saved.

According to other aspect of the invention, the weighting unit of the envelope detecting unit, amplitude change amount detecting unit, or correlation value calculating unit weights either the envelope signal or the amplitude change amount signal, and matches the amplitude between the envelope signal and amplitude change amount signal, and therefore the timing phase can be estimated at high precision.

According to other aspect of the invention, the signal variance detecting unit outputs the square root of the sum of the square value the difference between the in-phase component of the received base band signal multiplied by the predetermined number and the in-phase component of the received base band signal of one symbol before, and the square value of the difference between orthogonal component of the received base band signal multiplied by the predetermined number and orthogonal component of the received base band signal one symbol before, as the variance signal, and the amplitude change amount detecting unit outputs the square root of the sum of the square value of the difference between the in-phase component of the received base band signal and the in-phase component of the received base band signal of ½ symbol before, and the square value of the difference between the orthogonal component of the received base band signal and the orthogonal component of the received base band signal of ½ symbol before, as the amplitude change amount signal, and therefore the envelope signal for forming the complex symbol frequency component and the amplitude change amount signal can be obtained at high precision, and hence the timing phase can be estimated at high precision.

According to other aspect of the invention, the signal variance detecting unit outputs the sum of the square value the difference between the in-phase component of the received base band signal multiplied by the predetermined number and the in-phase component of the received base band signal of one symbol before, and the square value of the difference between orthogonal component of the received base band signal multiplied by the predetermined number and orthogonal component of the received base band signal one symbol before, as the variance signal, and the amplitude change amount detecting unit outputs the sum of the square value of the difference between the in-phase component of the received base band signal and the in-phase component of the received base band signal of ½ symbol before, and the square value of the difference between the orthogonal component of the received base band signal and the orthogonal component of the received base band signal of ½ symbol before, as the amplitude change amount signal, and therefore the square root is not calculated when obtaining the variance signal and the amplitude change amount signal for composing the complex symbol frequency component, so that the load can be saved in operation processing of complex symbol frequency component.

According to other aspect of the invention, the signal variance detecting unit outputs the sum of the absolute value the difference between the in-phase component of the received base band signal multiplied by the predetermined number and the in-phase component of the received base band signal of one symbol before, and the absolute value of the difference between orthogonal component of the received base band signal multiplied by the predetermined number and orthogonal component of the received base band signal one symbol before, as the variance signal, and the amplitude change amount detecting unit outputs the sum of the absolute value of the difference between the in-phase component of the received base band signal and the in-phase component of the received base band signal of ½ symbol before, and the absolute value of the difference between the orthogonal component of the received base band signal and the orthogonal component of the received base band signal of ½ symbol before, as the amplitude change amount signal, and therefore neither square root nor square is calculated, and only the addition and subtraction are operated, when obtaining the variance signal and the amplitude change amount signal for composing the complex symbol frequency component, so that the load can be substantially saved in operation processing of complex symbol frequency component.

According to other aspect of the invention, the signal variance detecting unit outputs the greater value of the absolute value of the difference between the phase of the reception base band multiplied by the predetermined number and the phase of the reception base band of one symbol before, and the value by subtracting the absolute value from $2\pi$, as the variance signal, and the amplitude change amount detecting unit outputs the greater value of the absolute value of the difference between the phase of the reception band signal, and the phase of the reception band signal of ½ symbol before, and the value by subtracting the absolute value from 2n, as the amplitude change amount signal, and therefore the square root is not calculated when obtaining the variance signal and the amplitude change amount signal for composing the complex symbol frequency component, so that the load can be substantially saved in operation processing of complex symbol frequency component.

According to other aspect of the invention, the weighting unit of the signal variance detecting unit, amplitude change amount detecting unit, or correlation value calculating unit weights either the variance signal or the amplitude change amount signal, and matches the amplitude between the variance signal and amplitude change amount signal, and therefore the timing phase can be estimated at high precision.

According to other aspect of the invention, the frequency converting unit converts the radio reception signal received by the antenna into a received base band signal, the A/D converting unit samples the received base band signal at a double speed of symbol rate, and converts and outputs as a reception digital base band signal, the timing reproducing unit determines the amplitude change amount between the envelope value of the reception digital base band signal and ½ symbol, further determines the correlation value between the complex symbol frequency component combining the envelope value and the amplitude change amount, and the cosine wave component of the free-running symbol frequency signal generated at the reception side, and calculates the vector angle indicated by the correlation value, thereby determining the phase timing error between the reception digital base band signal and the free-running symbol frequency signal, the data interpolating unit interpolates the reception digital base band signal, and outputs the interpolated data as interpolated base band, and the data judging unit extracts the Nyquist point of the interpolated base band signal based on the phase timing error determined by the timing reproducing unit, and outputs the data at the extracted Nyquist point as demodulated data, and therefore if, for example, the received base band signal is sampled at a double sampling speed of symbol rate, the phase timing error can be obtained at high speed and high precision. As a result, the data transmission speed can be relatively enhanced, and the demodulating apparatus can be realized by using A/D converting unit low in the upper limit of sampling speed, or CMOS device low in upper limit of operating speed, so that the wide-band radio communication system is realized at low cost (saving time and labor in manufacture) and low power consumption.

According to other aspect of the invention, the limiter constantly envelopes the radio reception signal received by the antenna, and outputs this constantly enveloped signal, the frequency converting unit converts the constantly enveloped signal into a received base band signal, the A/D converting unit samples the received base band signal at a double speed of symbol rate, and converts and outputs as a reception digital base band signal, the timing reproducing unit multiplies the reception digital base band signal by a predetermined number, determines the amplitude change amount between the variance value of one symbol before and after the multiplied reception digital base band signal and ½ symbol of the reception digital base band signal, further determines the correlation value between the complex symbol frequency component combining the variance value and the amplitude change amount, and the cosine wave component of the free-running symbol frequency signal generated at the reception side, and calculates the vector angle indicated by the correlation value, thereby determining the phase timing error between the reception digital base band signal and the free-running symbol frequency signal, the data interpolating unit interpolates the reception digital base band signal, and outputs the interpolated data as interpolated base band, and the data judging unit extracts the Nyquist point of the interpolated base band signal based on the phase timing error determined by the timing reproducing unit, and outputs the data at the extracted Nyquist point as demodulated data, and therefore if, for example, the received base band signal is sampled at a double sampling speed of symbol rate, the phase timing error can be obtained at high speed and high precision, or if the received base band signal is a nonlinearly amplified signal by a limiter amplifier, the phase timing error can be obtained also at high speed and high precision. As a result, the data transmission speed can be relatively enhanced, and the demodulating apparatus can be realized by using A/D converting unit low in the upper limit of sampling speed, or CMOS device low in upper limit of operating speed, the cost is low (saving time and labor in manufacture) and the power consumption is low, and further, using the limiter, a simple and small demodulating apparatus is realized, which can be easily applied in a wide-band radio communication system.

According to other aspect of the invention, the complex symbol frequency component generating step generates a transmission side complex symbol frequency component from a received base band signal, and outputs as a transmission complex symbol frequency component signal, the correlation value calculating step determines the correlation value between a cosine wave signal of a free-running symbol frequency generated at the reception side and the transmission complex symbol frequency component signal, and outputs this correlation value as a correlation signal, and the inverse tangent step calculates a vector angle indicated by the correlation signal, and determines a phase timing error between the received base band signal and free-running symbol frequency based on the vector angle, and therefore if, for example, the received base band signal is sampled at a double sampling speed of symbol rate, the phase timing error can be obtained at high speed and high precision, and the data transmission speed can be relatively enhanced.

According to other aspect of the invention, the complex symbol frequency component generating step generates a transmission side complex symbol frequency component from a received base band signal, and outputs as a transmission complex symbol frequency component signal, the correlation value calculating step determines the correlation value between a cosine wave signal of a free-running symbol frequency generated at the reception side and the transmission complex symbol frequency component signal, and outputs this correlation value as a correlation signal, the inverse tangent step calculates a vector angle indicated by the correlation signal, and determines a phase timing error between the received base band signal and free-running symbol frequency based on the vector angle, the vector length calculating step calculates the vector length indicated by the correlation signal, and the comparing step compares the vector length with a predetermined threshold, and outputs burst detection information showing detection of a burst signal when the vector length is longer than the predetermined threshold, and therefore if, for example, the received base band signal is sampled at a double sampling speed of symbol rate, the phase timing error can be obtained at high speed and high precision, and the data transmission speed can be relatively enhanced, and the burst timing of the burst signal is established at the same time.

According to other aspect of the invention, the envelope detecting step determines the envelope value of the received base band signal, and outputs the obtained envelope value as an envelope signal, and the amplitude change amount detecting step determines the amplitude change amount in ½ symbol of the received base band signal, and outputs this amplitude change amount as an amplitude change amount signal, and therefore the complex symbol frequency component generating step outputs the complex signal combining the envelope signal and amplitude change amount signal as the transmission complex symbol frequency component signal, and therefore if, for example, the received base band signal is sampled at a double sampling speed of symbol rate, the phase timing error can be obtained at high speed and high precision, and the data transmission speed can be relatively enhanced.

According to other aspect of the invention, the signal variance detecting step multiplies the received base band signal by a predetermined number, determines the variance value of one symbol before and after the multiplied received base band signal, and outputs this variance value as a variance signal, and the amplitude change amount detecting step determines the amplitude change amount in ½ symbol of the received base band signal, and outputs this amplitude change amount as an amplitude change amount signal, and therefore the complex symbol frequency component generating step outputs the complex signal combining the variance signal and amplitude change amount signal as the transmission complex symbol frequency component signal, and therefore if, for example, the received base band signal is sampled at a double sampling speed of symbol rate, the phase timing error can be obtained at high speed and high precision, and the data transmission speed can be relatively enhanced, and moreover if the received base band signal is a nonlinearly amplified signal by a limiter amplifier, the phase timing error can be obtained at high speed and high precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A timing reproducing apparatus comprising:
   a complex symbol frequency component generating unit which generates a transmission side complex symbol frequency component including an envelope value and amplitude change amount value both from a received base band signal, and outputs the transmission side complex symbol frequency component as a transmission side complex symbol frequency component signal;
   a correlation value calculating unit which determines a correlation value, between a cosine wave signal of a free-running symbol frequency generated at a reception side and the transmission side complex symbol frequency component signal, and outputs the correlation value as a correlation signal; and
   an inverse tangent unit which calculates a vector angle indicated by the correlation signal and determines a phase timing error between the received base band signal and free-running symbol frequency based on the calculated vector angle.

2. The timing reproducing apparatus according to claim 1, wherein said transmission side complex symbol frequency component generating unit includes,
   an envelope detecting unit which determines the envelope value of the received base band signal and outputs the envelope value as an envelope signal; and
      an amplitude change amount detecting unit which determines the amplitude change amount in ½ symbol of the received base band signal and outputs the amplitude change amount as an amplitude change amount signal,
   wherein a complex signal combining the envelope signal and amplitude change amount signal is output as the transmission side complex symbol frequency component signal.

3. A timing reproducing apparatus comprising:
   a complex symbol frequency component generating unit which generates a transmission side complex symbol frequency component from a received base band signal and outputs the transmission side complex symbol frequency component as a transmission side complex symbol frequency component signal;
   a correlation value calculating unit which determines a correlation value, between a cosine wave signal of a free-running symbol frequency generated at a reception side and the transmission side complex symbol frequency component signal and outputs the correlation value as a correlation signal; and
   an inverse tangent unit which calculates a vector angle indicated by the correlation signal and determines a phase timing error between the received base band signal and free-running symbol frequency based on the calculated vector angle,
   wherein said transmission side complex symbol frequency component generating unit includes,
      a signal variance detecting unit which multiplies the received base band signal by a predetermined number, determines the variance value of one symbol before and after the multiplied received base band signal, and outputs the variance value as a variance signal; and
      an amplitude change amount detecting unit which determines the amplitude change amount in ½ symbol of the received base band signal and outputs the amplitude change amount as an amplitude change amount signal, and wherein the complex signal combining the variance signal and amplitude change amount signal is output as the transmission side complex symbol frequency component signal.

4. The timing reproducing apparatus according to claim 2, wherein
   said envelope detecting unit outputs as the envelope signal a square root of the sum of the squares of an in-phase component and an orthogonal component of the received base band signal, and
   said amplitude change amount detecting unit outputs as the amplitude change amount signal a square root of the sum of the (1) squares of a difference between the in-phase component and an in-phase component before ½ symbol and (2) squares of a difference between the orthogonal component and an orthogonal component before ½ symbol.

5. The timing reproducing apparatus according to claim 2, wherein
   said envelope detecting unit outputs as the envelope signal the sum of the squares of an in-phase component and an orthogonal component of the received base band signal as the envelope signal, and said amplitude change amount detecting unit outputs as the amplitude change amount signal the sum of (1) the squares of the difference between the in-phase component and an in-phase component before ½ symbol and (2) the squares of the difference between the orthogonal component and the orthogonal component before ½ symbol.

6. The timing reproducing apparatus according to claim 2, wherein
   said envelope detecting unit outputs the sum of the absolute values of an in-phase component and an orthogonal component of the received base band signal as the envelope signal, and said amplitude change amount detecting unit outputs as the amplitude change amount signal the sum of (1) the absolute values of a difference between the in-phase component and in-phase component before ½ symbol and (2) the absolute values of a difference between the orthogonal component and an orthogonal component before ½ symbol.

7. The timing reproducing apparatus according to claim 2, wherein said envelope detecting unit, amplitude change amount detecting unit, or correlation value calculating unit further includes a weighting unit which weights either the envelope signal or the amplitude change amount signal and matches the amplitude between the envelope signal and amplitude change amount signal.

8. The timing reproducing apparatus according to claim 3, wherein said signal variance detecting unit outputs as the variance signal a square root of (1) the sum of the squares of the difference between the in-phase component of the received base band signal multiplied by the predetermined number and the in-phase component of the received base band signal of one symbol before, and (2) the squares of the difference between the orthogonal component of the received base band signal multiplied by the predetermined number and the orthogonal component of the received base band signal one symbol before, and said amplitude change amount detecting unit outputs as the amplitude change amount signal a square root of the sum of (1) the squares of the difference between the in-phase component of the received base band signal and the in-phase component of the received base band signal of ½ symbol before, and (2) the squares of the difference between the orthogonal component of the received base band signal and the orthogonal component of the received base band signal of ½ symbol before.

9. The timing reproducing apparatus according to claim 3, wherein said signal variance detecting unit outputs as the variance signal the sum of (1) the squares of the difference between the in-phase component of the received base band signal multiplied by the predetermined number and the in-phase component of the received base band signal of one symbol before, and (2) the squares of the difference between orthogonal component of the received base band signal multiplied by the predetermined number and orthogonal component of the received base band signal one symbol before, and said amplitude change amount detecting unit outputs as the amplitude change amount signal the sum of (1) the square value of the difference between the in-phase component of the received base band signal and the in-phase component of the received base band signal of ½ symbol before, and (2) the square value of the difference between the orthogonal component of the received base band signal and the orthogonal component of the received base band signal of ½ symbol before.

10. The timing reproducing apparatus according to claim 3, wherein said signal variance detecting unit outputs as the variance signal the sum of (1) the absolute value the difference between the in-phase component of the received base band signal multiplied by the predetermined number and the in-phase component of the received base band signal of one symbol before, and (2) the absolute value of the difference between orthogonal component of the received base band signal multiplied by the predetermined number and orthogonal component of the received base band signal one symbol before, and said amplitude change amount detecting unit outputs as the amplitude change amount signal the sum of (1) the absolute value of the difference between the in-phase component of the received base band signal and the in-phase component of the received base band signal of ½ symbol before, and (2) the absolute value of the difference between the orthogonal component of the received base band signal and the orthogonal component of the received base band signal of ½ symbol before.

11. The timing reproducing apparatus according to claim 3, wherein said signal variance detecting unit outputs as the variance signal the greater value of (1) the absolute value of the difference between the phase of the reception base band multiplied by the predetermined number and the phase of the reception base band of one symbol before, and (2) the value by subtracting said absolute value from $2\pi$, and said amplitude change amount detecting unit outputs as the amplitude change amount signal the greater value of (1) the absolute value of the difference between the phase of the reception band signal, and the phase of the reception band signal of ½ symbol before, and (2) the value by subtracting said absolute value from $2\pi$.

12. A timing reproducing apparatus comprising:

a complex symbol frequency component generating unit which generates a transmission side complex symbol frequency component including an envelope value and amplitude change amount value both from a received base band signal, and outputs the transmission side complex symbol frequency component as a transmission side complex symbol frequency component signal;

a correlation value calculating unit which determines a correlation value, between a cosine wave signal of a free-running symbol frequency generated at a reception side and the transmission side complex symbol frequency component signal, and outputs the correlation value as a correlation signal;

an inverse tangent unit which calculates a vector angle indicated by the correlation signal and determines a phase timing error between the received base band signal and free-running symbol frequency based on the vector angle;

a vector length calculating unit which calculates the vector length indicated by the correlation signal; and a comparing unit which compares the calculated vector length with a predetermined threshold and outputs burst detection information that indicates detection of a burst signal when the vector length is longer than the predetermined threshold.

13. A timing reproducing apparatus comprising:

a complex symbol frequency component generating unit which generates a transmission side complex symbol frequency component from a received base band signal, and outputs the transmission side complex symbol frequency component as a transmission side complex symbol frequency component signal;

a correlation value calculating unit which determines a correlation value, between a cosine wave signal of a free-running symbol frequency generated at a reception side and the transmission side complex symbol frequency component signal, and outputs the correlation value as a correlation signal;

an inverse tangent unit which calculates a vector angle indicated by the correlation signal and determines a phase timing error between the received base band signal and free-running symbol frequency based on the vector angle;

a vector length calculating unit which calculates the vector length indicated by the correlation signal; and a comparing unit which compares the calculated vector length with a predetermined threshold and outputs burst detection information that indicates detection of a burst signal when the vector length is longer than the predetermined threshold, wherein said complex symbol frequency component generating unit includes, an envelope detecting unit which determines an envelope value of the received base band signal and outputs the envelope value as an envelope signal; and an amplitude change amount detecting unit which determines an amplitude change amount in ½ symbol of the received base band signal and outputs the amplitude change amount as an amplitude change amount signal, wherein a complex signal combining the envelope signal and amplitude change amount signal is output as the transmission side complex symbol frequency component signal.

14. A timing reproducing apparatus comprising:

a complex symbol frequency component generating unit which generates a transmission side complex symbol frequency component from a received base band signal, and outputs the transmission side complex symbol frequency component as a transmission side complex symbol frequency component signal;

a correlation value calculating unit which determines a correlation value, between a cosine wave signal of a free-running symbol frequency generated at a reception side and the transmission side complex symbol frequency component signal and outputs the correlation value as a correlation signal;

an inverse tangent unit which calculates a vector angle indicated by the correlation signal and determines a phase timing error between the received base band signal and free-running symbol frequency based on the vector angle;

a vector length calculating unit which calculates the vector length indicated by the correlation signal; and a comparing unit which compares the calculated vector length with a predetermined threshold and outputs burst detection information that indicates detection of a burst signal when the vector length is longer than the predetermined threshold, wherein said complex symbol frequency component generating unit includes, a signal variance detecting unit which multiplies the received base band signal by a predetermined number, determines the variance value of one symbol before and after the multiplied received base band signal, and outputs the variance value as a variance signal; and an amplitude change amount detecting unit which determines the amplitude change amount in ½ symbol of the received base band signal and outputs the amplitude change amount as an amplitude change amount signal, wherein a complex signal combining the variance signal and amplitude change amount signal is output as the transmission side complex symbol frequency component signal.

15. The timing reproducing apparatus according to claim 13, wherein said envelope detecting unit outputs as the envelope signal a square root of the sum of the squares of an in-phase component and orthogonal component of the received base band signal, and said amplitude change amount detecting unit outputs as the amplitude change amount signal a square root of the sum of the (1) squares of a difference between the in-phase component and an in-phase component before ½ symbol and (2) squares of a difference between the orthogonal component and an orthogonal component before ½ symbol.

16. The timing reproducing apparatus according to claim 13, wherein said envelope detecting unit outputs as the envelope signal the sum of the squares of an in-phase component and an orthogonal component of the received base band signal, and said amplitude change amount detecting unit outputs as the amplitude change amount signal the sum of (1) the squares of the difference between the in-phase component and the in-phase component before ½ symbol and (2) the squares of the difference between the orthogonal component and the orthogonal component before ½ symbol.

17. The timing reproducing apparatus according to claim 13, wherein said envelope detecting unit outputs as the envelope signal the sum of the absolute values of an in-phase component and orthogonal component of the received base band signal, and said amplitude change amount detecting unit as the amplitude change amount signal outputs the sum of (1) the absolute values of a difference between the in-phase component and in-phase component before ½ symbol and (2) the absolute values of a difference between the orthogonal component and an orthogonal component before ½ symbol.

18. The timing reproducing apparatus according to claim 13, wherein said envelope detecting unit, amplitude change amount detecting unit, or correlation value calculating unit further includes a weighting unit which weights either the envelope signal or the amplitude change amount signal and matches the amplitude between the envelope signal and amplitude change amount signal.

19. The timing reproducing apparatus according to claim 14, wherein said signal variance detecting unit outputs as the variance signal a square root of the sum of (1) the squares of the difference between the in-phase component of the received base band signal multiplied by the predetermined number and the in-phase component of the received base band signal of one symbol before, and (2) the squares of the difference between the orthogonal component of the received base band signal multiplied by the predetermined number and the orthogonal component of the received base band signal one symbol before, as the variance signal, and said amplitude change amount detecting unit outputs as the amplitude change amount signal a square root of the sum of (1) the squares of the difference between the in-phase component of the received base band signal and the in-phase component of the received base band signal of ½ symbol before, and (2) the squares of the difference between the orthogonal component of the received base band signal and the orthogonal component of the received base band signal of ½ symbol before.

20. The timing reproducing apparatus according to claim 14, wherein said signal variance detecting unit outputs as the variance signal the sum of (1) the squares of the difference between the in-phase component of the received base band signal multiplied by the predetermined number and the in-phase component of the received base band signal of one symbol before, and (2) the squares of the difference between orthogonal component of the received base band signal multiplied by the predetermined number and orthogonal component of the received base band signal one symbol before, and said amplitude change amount detecting unit outputs as the amplitude change amount signal the sum of (1) the square value of the difference between the in-phase component of the received base band signal and the in-phase component of the received base band signal of ½ symbol before, and (2) the square value of the difference between the orthogonal component of the received base band signal and the orthogonal component of the received base band signal of ½ symbol before.

21. The timing reproducing apparatus according to claim 14, wherein said signal variance detecting unit outputs as the variance signal the sum of (1) the absolute value the difference between the in-phase component of the received base band signal multiplied by the predetermined number and the in-phase component of the received base band signal of one symbol before, and (2) the absolute value of the difference between orthogonal component of the received base band signal multiplied by the predetermined number and orthogonal component of the received base band signal one symbol before, and said amplitude change amount detecting unit outputs as the amplitude change amount signal the sum of (1) the absolute value of the difference between the in-phase component of the received base band signal and the in-phase component of the received base band signal of ½ symbol before, and (2) the absolute value of the difference between the orthogonal component of the received base band signal and the orthogonal component of the received base band signal of ½ symbol before.

22. The timing reproducing apparatus according to claim 14, wherein said signal variance detecting unit outputs as the variance signal the greater value of (1) the absolute value of the difference between the phase of the reception base band multiplied by the predetermined number and the phase of the reception base band of one symbol before, and (2) the value by subtracting said absolute value from $2\pi$, and said amplitude change amount detecting unit outputs as the amplitude change amount signal the greater value of (1) the absolute value of the difference between the phase of the reception band signal, and the phase of the reception band signal of ½ symbol before, and (2) the value by subtracting said absolute value from $2\pi$.

23. A demodulating apparatus comprising:

an antenna which receives a radio reception signal;

a frequency converting unit which converts the radio reception signal received by said antenna into a received base band signal;

an A/D converting unit which samples the received base band signal at a double speed of symbol rate and converts and outputs the sampled signal as a reception digital base band signal;

a timing reproducing unit which,
determines the amplitude change amount between the envelope value of the reception digital base band signal and ½ symbol,
determines the correlation value between the transmission side complex symbol frequency component combining the envelope value and the amplitude change amount, and the cosine wave component of the free-running symbol frequency signal generated at the reception side, and
calculates the vector angle indicated by the correlation value, thereby determining the phase timing error between the reception digital base band signal and the free-running symbol frequency signal;

a data interpolating unit which interpolates the reception digital base band signal and outputs the interpolated data as interpolated base band; and a data judging unit which extracts the Nyquist point of the interpolated base band signal based on the phase timing error determined by said timing reproducing unit and outputs the data at the extracted Nyquist point as demodulated data.

24. A demodulating apparatus comprising:

an antenna which receives a radio reception signal;

a limiter which constantly envelopes the radio reception signal received by said antenna and outputs the constantly enveloped signal;

a frequency converting unit which converts the constantly enveloped signal into a received base band signal;

an A/D converting unit which samples the received base band signal at a double speed of symbol rate, converts and outputs the sampled signal as a reception digital base band signal;

a timing reproducing unit which,
multiplies the reception digital base band signal by a predetermined number,
determines the amplitude change amount between the variance value of one symbol before and after the multiplied reception digital base band signal and ½ symbol of the reception digital base band signal,
determines the correlation value between the transmission side complex symbol frequency component combining the variance value and the amplitude change amount, and the cosine wave component of the free-running symbol frequency signal generated at the reception side, and
calculates the vector angle indicated by the correlation value, thereby determining the phase timing error between the reception digital base band signal and the free-running symbol frequency signal;

a data interpolating unit which interpolates the reception digital base band signal and outputs the interpolated data as interpolated base band; and a data judging unit which extracts the Nyquist point of the interpolated base band signal based on the phase timing error determined by said timing reproducing unit and outputs the extracted data at the extracted Nyquist point as demodulated data.

25. A timing reproducing method comprising:

generating a transmission side complex symbol frequency component including an envelope value and amplitude change amount value both from a received base band signal, and outputting the transmission side complex symbol frequency component as a transmission side complex symbol frequency component signal;

determining the correlation values, between a cosine wave signal of a free-running symbol frequency generated at a reception side and the transmission side complex symbol frequency component signal, and outputting the correlation value as a correlation signal; and calculating a vector angle indicated by the correlation signal, and determining a phase timing error between the received base band signal and free-running symbol frequency based on the vector angle.

26. The timing reproducing method according to claim 25, wherein said transmission side complex symbol frequency component generating step includes:

determining the envelope value of the received base band signal and outputting the envelope value as an envelope signal; and determining the amplitude change amount in ½ symbol of the received base band signal, and outputting the amplitude change amount as an the amplitude change amount signal;

wherein a complex signal combining the envelope signal and amplitude change amount signal is issued as the transmission side complex symbol frequency component signal.

27. A timing reproducing method comprising:

generating a transmission side complex symbol frequency component from a received base band signal, and outputting the transmission side complex symbol frequency component as a transmission side complex symbol frequency component signal;

determining the correlation value, between a cosine wave signal of a free-running symbol frequency generated at a reception side and the transmission side complex symbol frequency component signal, and outputting the correlation value as a correlation signal; and calculating a vector angle indicated by the correlation signal, and determining a phase timing error between the received base band signal and free-running symbol frequency based on the vector angle, wherein said transmission side complex symbol frequency component generating includes, multiplying the received base band signal by a predetermined number, determining the variance value of one symbol before and after the multiplied received base band signal, and outputting the variance value as a variance signal; and determining the amplitude change amount in ½ symbol of the received base band signal, and outputting the amplitude change amount as an amplitude change amount signal;

wherein a complex signal combining the variance signal and amplitude change amount signal is issued as the transmission side complex symbol frequency component signal.

28. A timing reproducing method comprising:

generating a transmission side complex symbol frequency component including an envelope value and amplitude change amount value both from a received base band signal, and outputting the transmission side complex symbol frequency component as a transmission side complex symbol frequency component signal;

determining the correlation value, between a cosine wave signal of a free-running symbol frequency generated at a reception side and the transmission side complex symbol frequency component signal, and outputting the correlation value as a correlation signal;

calculating a vector angle indicated by the correlation signal, and determining a phase timing error between the received base band signal and free-running symbol frequency based on the vector angle;

calculating the vector length indicated by the correlation signal; and comparing the vector length with a predetermined threshold, and outputting burst detection information that indicates detection of a burst signal when the vector length is longer than the predetermined threshold.

29. The timing reproducing method according to claim 28, wherein said transmission side complex symbol frequency component generating includes, determining the envelope value of the received base band signal and outputting the obtained envelope value as an envelope signal; and determining the amplitude change amount in ½ symbol of the received base band signal, and outputting the amplitude change amount as an amplitude change amount signal;

wherein a complex signal combining the envelope signal and amplitude change amount signal is issued as the transmission side complex symbol frequency component signal.

30. A timing reproducing method comprising:

generating a transmission side complex symbol frequency component from a received base band signal, and outputting the transmission side complex symbol frequency component as a transmission side complex symbol frequency component signal;

determining the correlation value, between a cosine wave signal of a free-running symbol frequency generated at a reception side and the transmission side complex symbol frequency component signal, and outputting the correlation value as a correlation signal;

calculating a vector angle indicated by the correlation signal, and determining a phase timing error between the received base band signal and free-running symbol frequency based on the vector angle;

calculating the vector length indicated by the correlation signal; and a comparing step of comparing the vector length with a predetermined threshold, and outputting burst detection information that indicates detection of a burst signal when the vector length is longer than the predetermined threshold, wherein said transmission side complex symbol frequency component generating includes, multiplying the received base band signal by a predetermined number, determining the variance value of one symbol before and after the multiplied received base band signal, and outputting the variance value as a variance signal; and determining the amplitude change amount in ½ symbol of the received base band signal, and outputting the amplitude change amount as an amplitude change amount signal;

wherein a complex signal combining the variance signal and amplitude change amount signal is issued as the transmission side complex symbol frequency component signal.

* * * * *